（12）United States Patent
Plotnikov et al.

(10) Patent No.: US 9,910,670 B2
(45) Date of Patent: Mar. 6, 2018

(54) INSTRUCTION SET FOR ELIMINATING MISALIGNED MEMORY ACCESSES DURING PROCESSING OF AN ARRAY HAVING MISALIGNED DATA ROWS

(71) Applicant: Intel Corporation, Santa Clara, CA (US)

(72) Inventors: Mikhail Plotnikov, Nizhny Novgorod (RU); Igor Ermolaev, Nizhny Novgorod (RU)

(73) Assignee: INTEL CORPORATION, Santa Clara, CA (US)

(*) Notice: Subject to any disclaimer, the term of this patent is extended or adjusted under 35 U.S.C. 154(b) by 739 days.

(21) Appl. No.: 14/327,534

(22) Filed: Jul. 9, 2014

(65) Prior Publication Data

US 2016/0011870 A1 Jan. 14, 2016

(51) Int. Cl.
*G06F 9/30* (2006.01)
(52) U.S. Cl.
CPC ...... *G06F 9/30036* (2013.01); *G06F 9/30032* (2013.01)
(58) Field of Classification Search
None
See application file for complete search history.

(56) References Cited

U.S. PATENT DOCUMENTS 5,781,457 A * 7/1998 Cohen ............... G06F 7/575
708/231
8,493,398 B2 7/2013 Comparan et al.
(Continued)

FOREIGN PATENT DOCUMENTS

CN 101002169 A 7/2007
TW 386193 B 4/2000
(Continued)

OTHER PUBLICATIONS

First Office Action and Search Report from foreign counterpart Chinese Patent Application No. 201510313561.1, dated Jun. 1, 2017, 17 pages. (translation available only for office action).

(Continued)

*Primary Examiner* — John Lindlof
(74) *Attorney, Agent, or Firm* — Nicholson De Vos Webster & Elliott LLP

(57) ABSTRACT

A processor is described having an instruction execution pipeline. The instruction execution pipeline includes an instruction fetch stage to fetch an instruction. The instruction format of the instruction specifies a first input vector, a second input vector and a third input operand. The instruction execution pipeline comprises an instruction decode stage to decode the instruction. The instruction execution pipeline includes a functional unit to execute the instruction. The functional unit includes a routing network to route a first contiguous group of elements from a first end of one of the input vectors to a second end of the instruction's resultant vector, and, route a second contiguous group of elements from a second end of the other of the input vectors to a first end of the instruction's resultant vector. The first and second ends are opposite vector ends. The first and second groups of contiguous elements are defined from the third input operand. The instruction is not capable of routing non-contiguous groups of elements from the input vectors to the instruction's resultant vector. A software pipeline that uses the instruction is also described.

22 Claims, 19 Drawing Sheets

(56) References Cited

U.S. PATENT DOCUMENTS

2009/0037694 A1    2/2009   Luick et al.
2014/0189295 A1    7/2014   Uliel et al.

FOREIGN PATENT DOCUMENTS

| TW | 506216 B | 10/2002 |
|----|----------|---------|
| TW | 564368 B | 12/2003 |
| TW | I245219 B | 12/2005 |
| WO | 2013095576 A1 | 6/2013 |

OTHER PUBLICATIONS

Office Action and Search Report from foreign counterpart Taiwan Patent Application No. 104117962, dated Mar. 30, 2017, 12 pages.

* cited by examiner

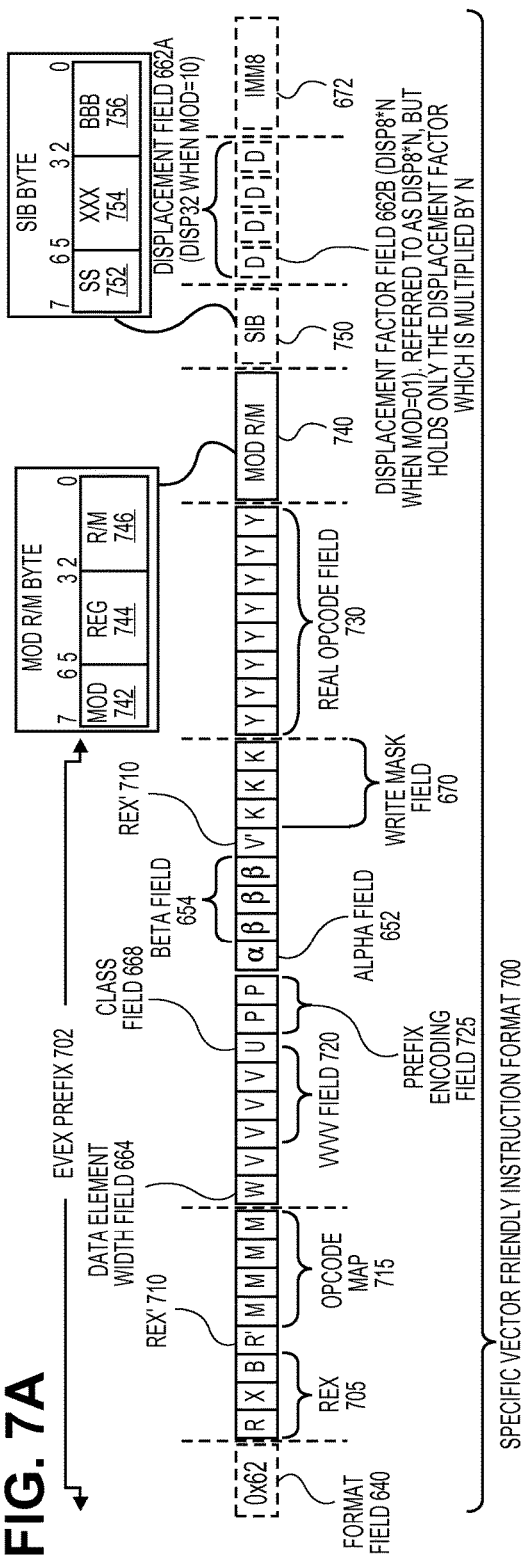
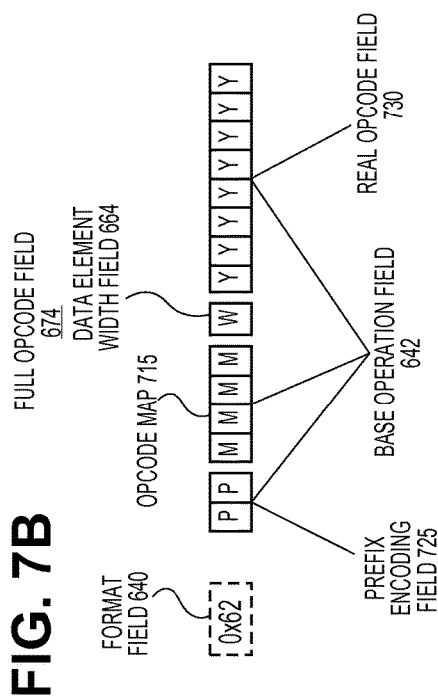
FIG. 7A
FIG. 7B
FIG. 7C

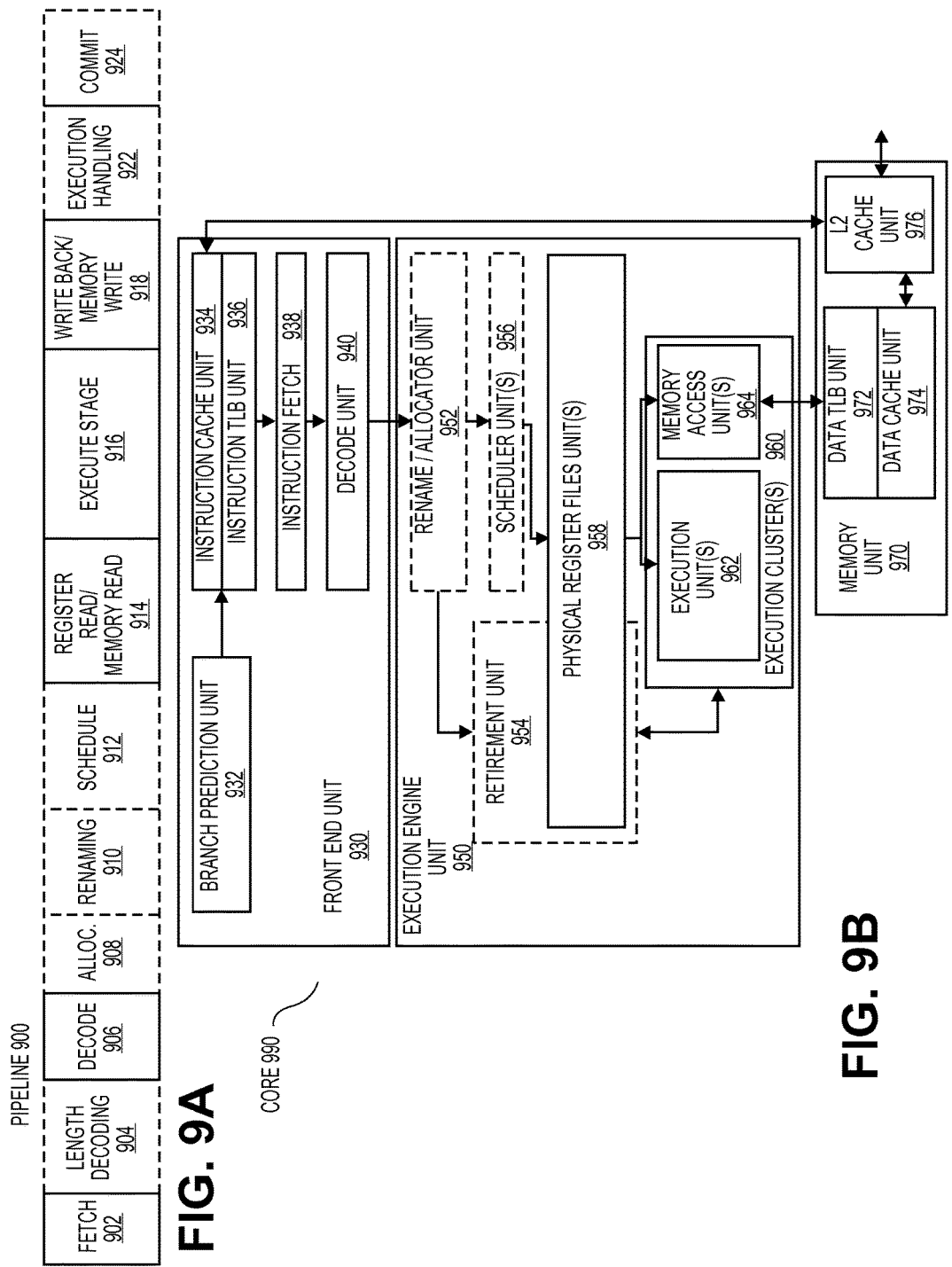

US 9,910,670 B2

INSTRUCTION SET FOR ELIMINATING MISALIGNED MEMORY ACCESSES DURING PROCESSING OF AN ARRAY HAVING MISALIGNED DATA ROWS

FIELD OF INVENTION

The field of invention pertains to the computing sciences, and, more specifically, to an instruction set for eliminating misaligned memory accesses during processing of an array having misaligned data rows.

BACKGROUND

FIG. 1 shows a high level diagram of a processing core 100 implemented with logic circuitry on a semiconductor chip. The processing core includes a pipeline 101. The pipeline consists of multiple stages each designed to perform a specific step in the multi-step process needed to fully execute a program code instruction. These typically include at least: 1) instruction fetch and decode; 2) data fetch; 3) execution; 4) write-back. The execution stage performs a specific operation identified by an instruction that was fetched and decoded in prior stage(s) (e.g., in step 1) above) upon data identified by the same instruction and fetched in another prior stage (e.g., step 2) above). The data that is operated upon is typically fetched from (general purpose) register storage space 102. New data that is created at the completion of the operation is also typically "written back" to register storage space (e.g., at stage 4) above).

The logic circuitry associated with the execution stage is typically composed of multiple "execution units" or "functional units" 103_1 to 103_N that are each designed to perform its own unique subset of operations (e.g., a first functional unit performs integer math operations, a second functional unit performs floating point instructions, a third functional unit performs load/store operations from/to cache/memory, etc.). The collection of all operations performed by all the functional units corresponds to the "instruction set" supported by the processing core 100.

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 2A and 2B present a comparative example that demonstrates the basic difference between a scalar processor and a vector processor.

FIG. 2A shows an example of a scalar AND instruction in which a single operand set, A and B, are ANDed together to produce a singular (or "scalar") result C (i.e., AB=C). By contrast, FIG. 2B shows an example of a vector AND instruction in which two operand sets, A/B and D/E, are respectively ANDed together in parallel to simultaneously produce a vector result C, F (i.e., A.AND.B=C and D.AND.E=F). As a matter of terminology, a "vector" is a data element having multiple "elements". For example, a vector V=Q, R, S, T, U has five different elements: Q, R, S, T and U. The "size" of the exemplary vector V is five (because it has five elements).

FIG. 1 also shows the presence of vector register space 107 that is different than general purpose register space 102. Specifically, general purpose register space 102 is nominally used to store scalar values. As such, when any of the execution units perform scalar operations they nominally use operands called from (and write results back to) general purpose register storage space 102. By contrast, when any of the execution units perform vector operations they nominally use operands called from (and write results back to) vector register space 107. Different regions of memory may likewise be allocated for the storage of scalar values and vector values. Notably, some machines may use vector register space to store floating point scalar values.

FIGURES

A better understanding of the present invention can be obtained from the following detailed description in conjunction with the following drawings, in which:

FIG. 1 shows an instruction execution pipeline;

FIGS. 2a and 2b compare scalar vs. vector processing;

FIGS. 7a-d are block diagrams illustrating an exemplary specific vector friendly instruction format according to embodiments of the invention.

Figure 8:
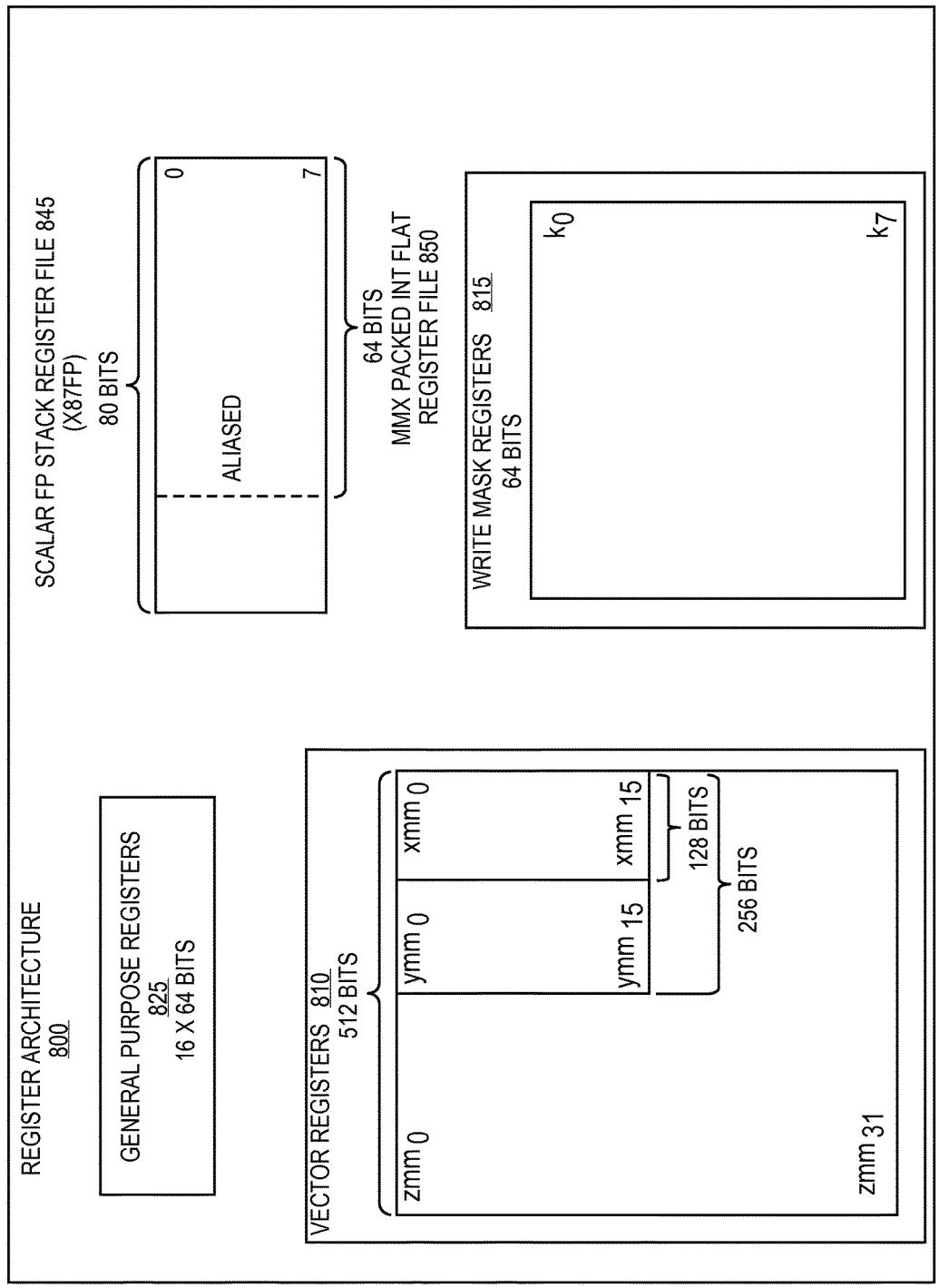

FIG. 8 is a block diagram of a register architecture according to one embodiment of the invention.

FIG. 9a is a block diagram of a single CPU core, along with its connection to the on-die interconnect network and with its local subset of the level 2 (L2) cache, according to embodiments of the invention.

FIG. 9b is an exploded view of part of the CPU core in FIG. 9A according to embodiments of the invention.

Figure 10B:
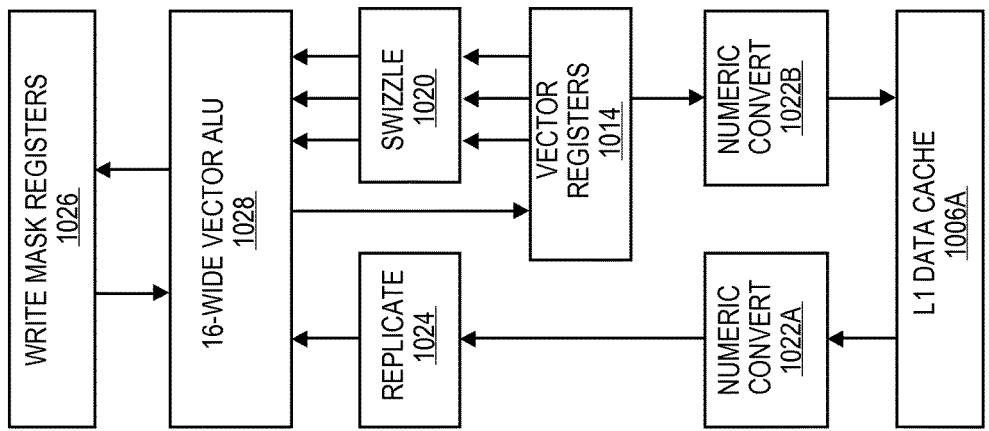
Figure 10A:
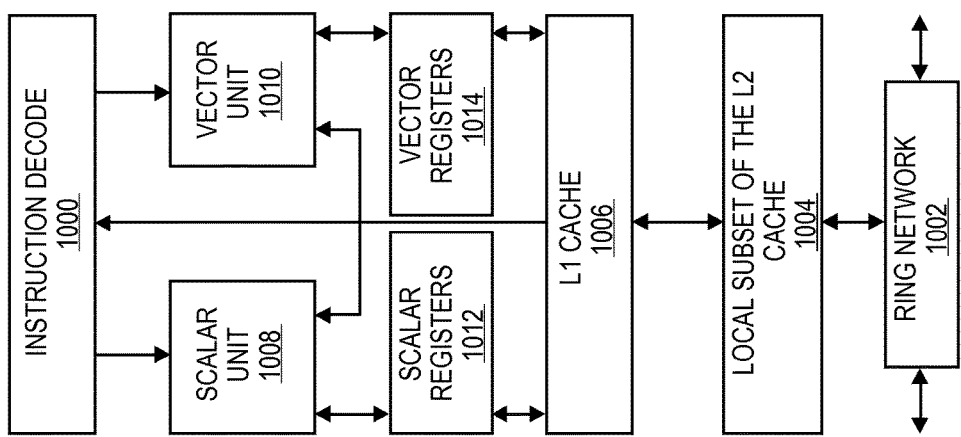

FIGS. 10a-b are block diagrams illustrating an exemplary out-of-order architecture according to embodiments of the invention.

Figure 11:
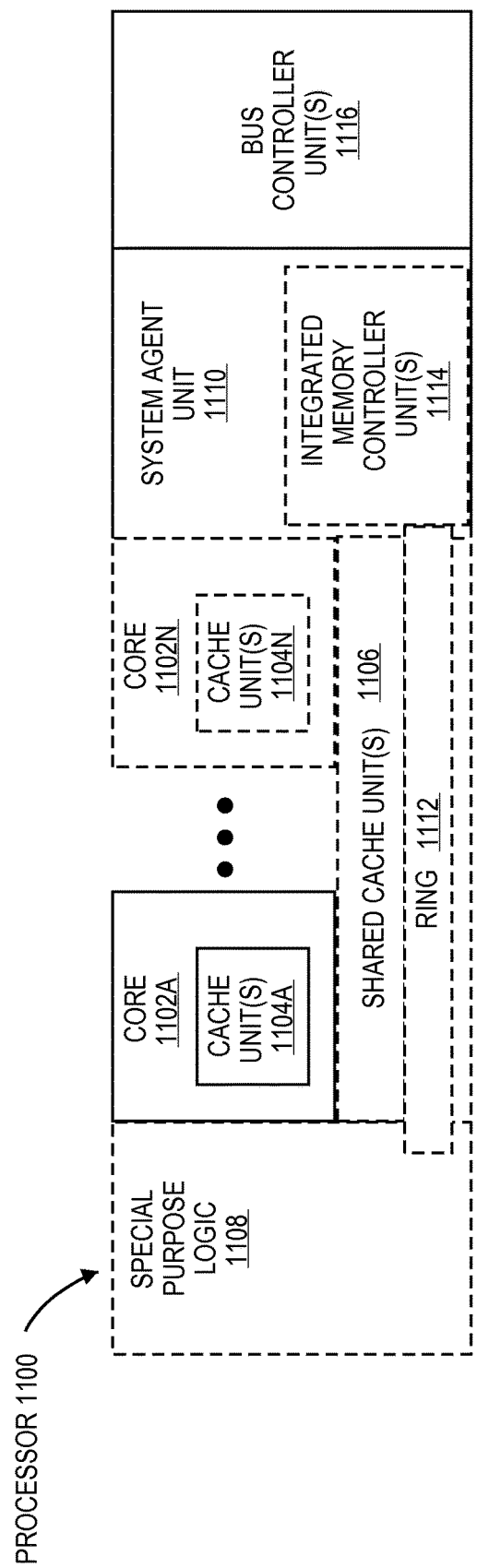

FIG. 11 is a block diagram of a system in accordance with one embodiment of the invention.

Figure 12:
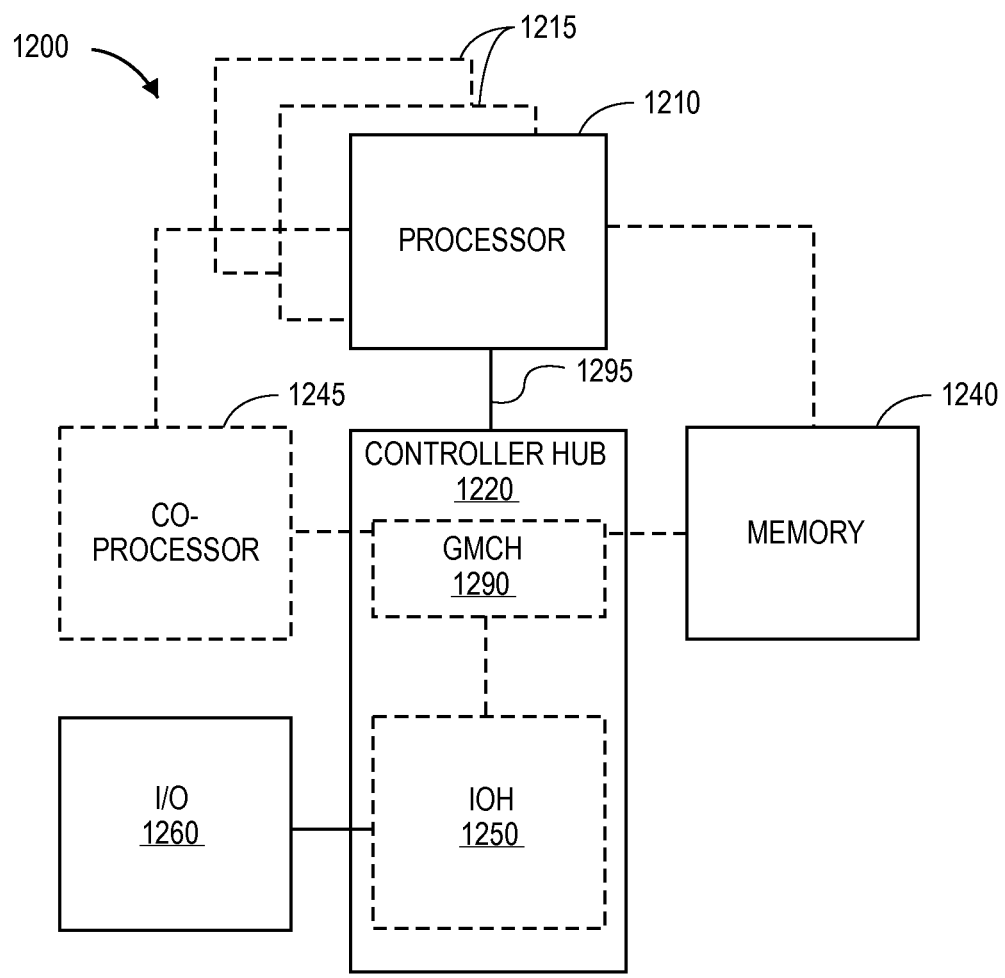

FIG. 12 is a block diagram of a second system in accordance with an embodiment of the invention.

Figure 13:
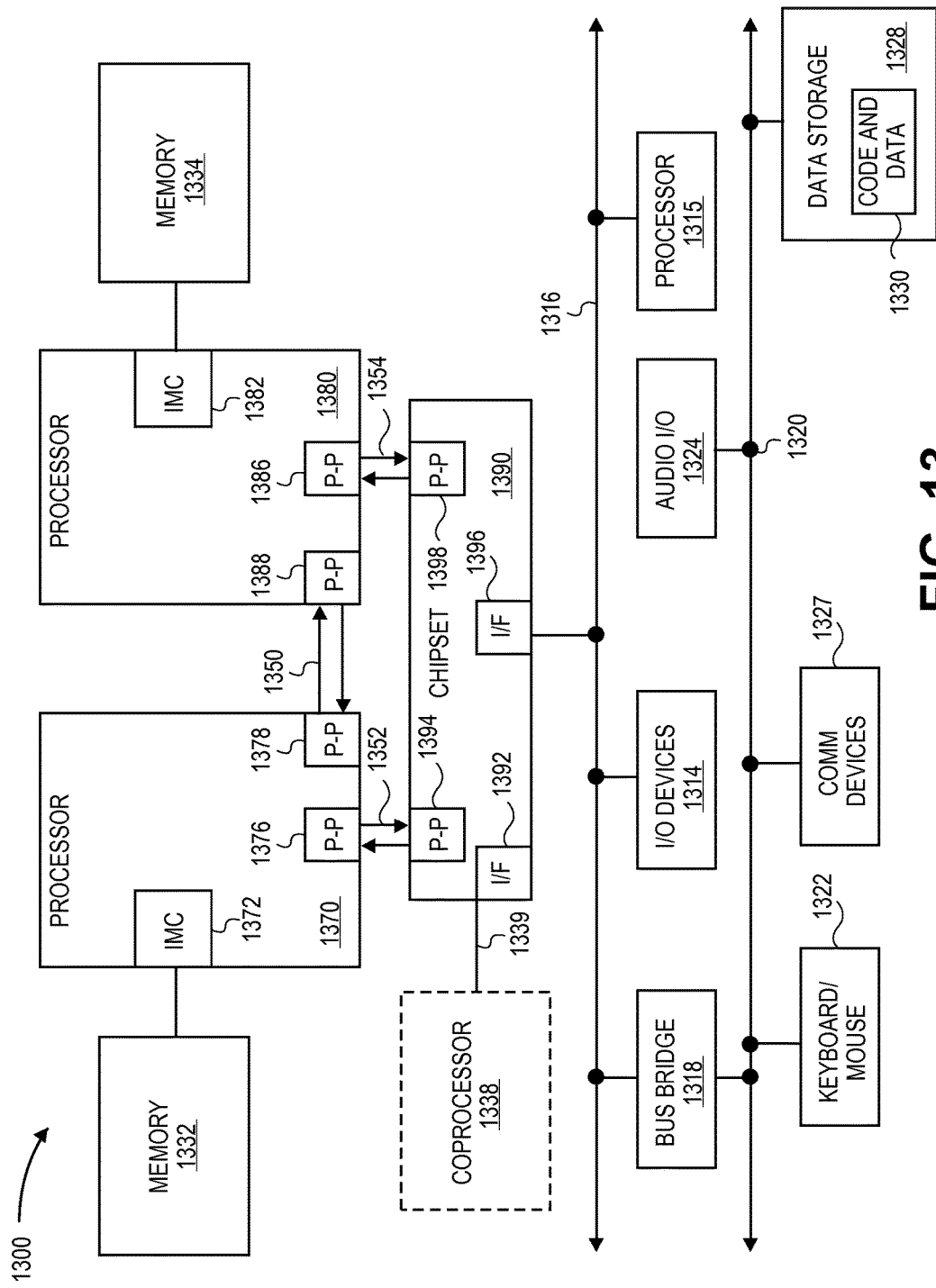

FIG. 13 is a block diagram of a third system in accordance with an embodiment of the invention.

Figure 14:
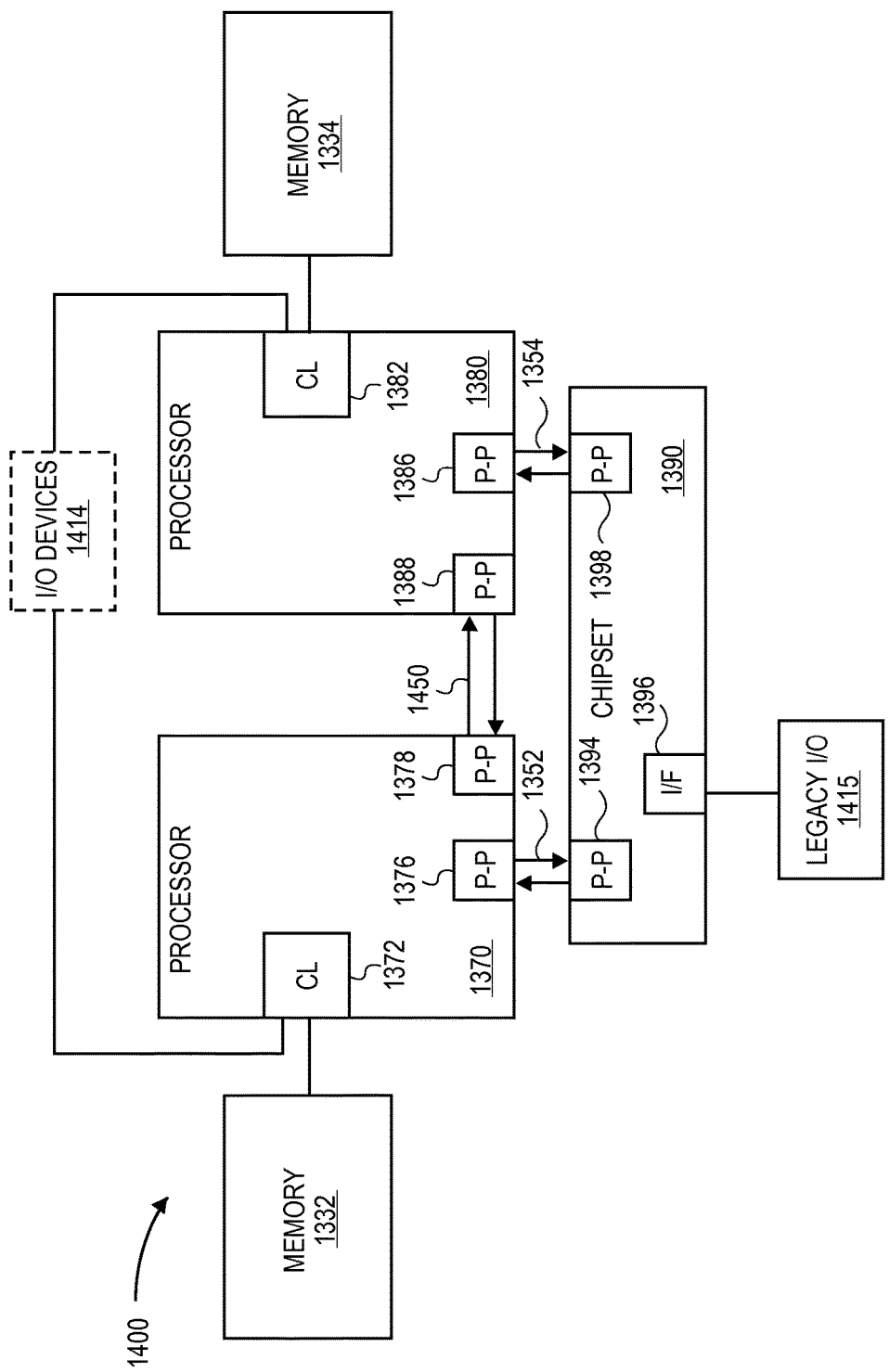

FIG. 14 is a block diagram of a SoC in accordance with an embodiment of the invention.

Figure 15:
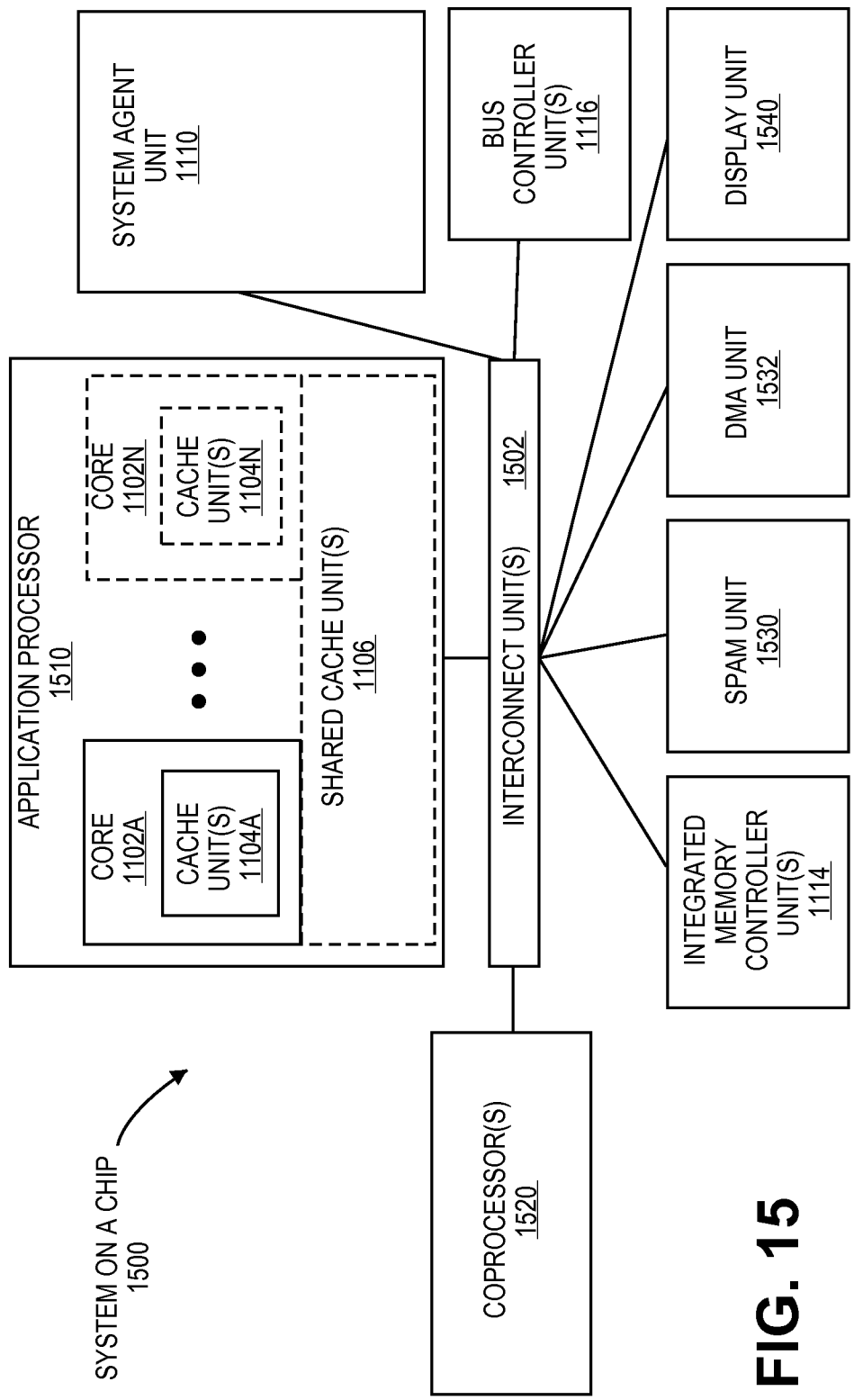

FIG. 15 is a block diagram of a single core processor and a multicore processor with integrated memory controller and graphics according to embodiments of the invention.

Figure 16:
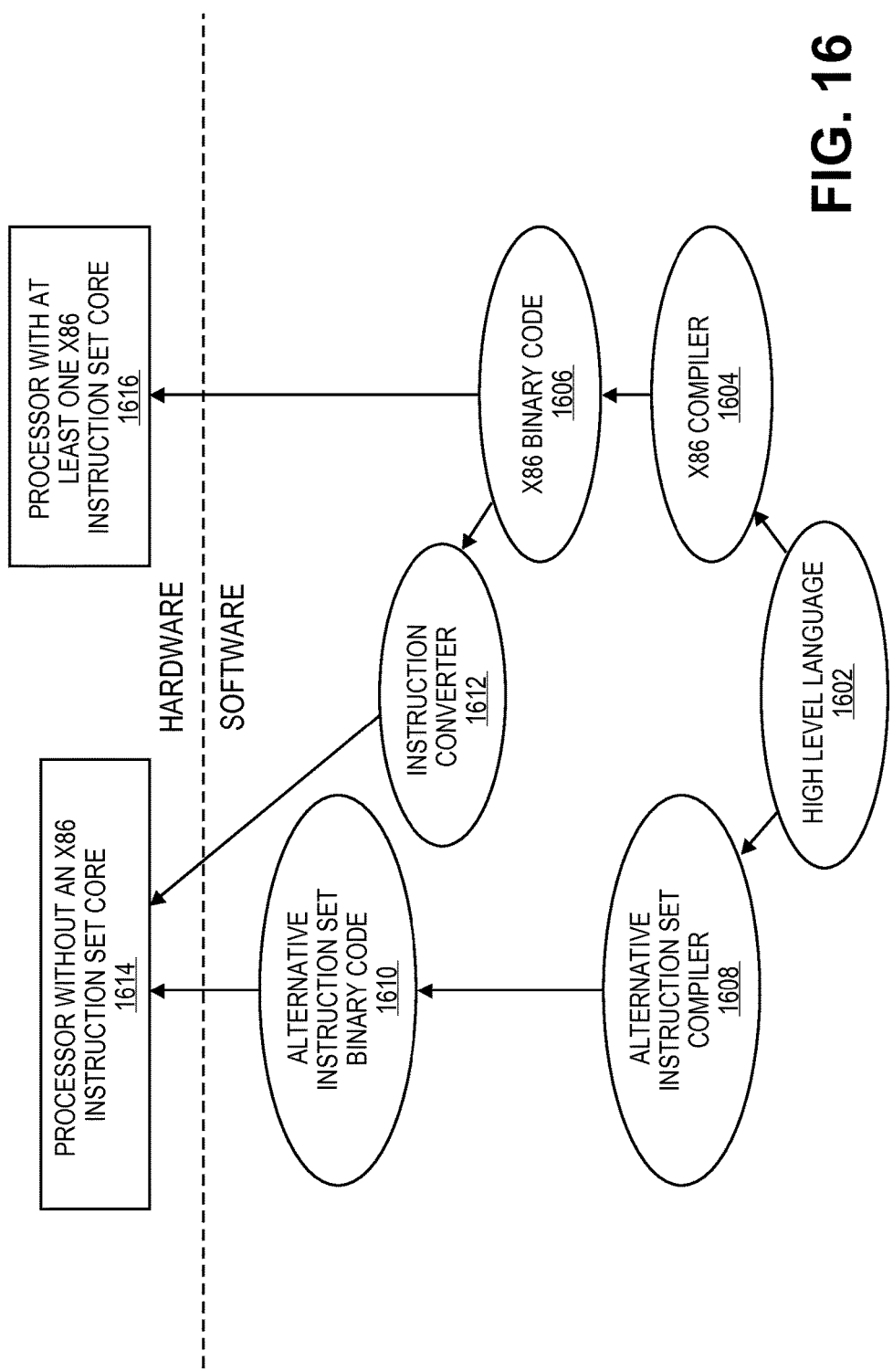

FIG. 16 is a block diagram contrasting the use of a software instruction converter to convert binary instructions in a source instruction set to binary instructions in a target instruction set according to embodiments of the invention.

DETAILED DESCRIPTION

Vector processing is useful for processing arrays. As an example, each vector may correspond to a row in the array. According to basic array processing, a row's worth of information (or simply, a "row" of the array) is read from the input array and is processed. A row's worth of resultant information from the processing is then written into the resultant array structure.

Figure 3A:
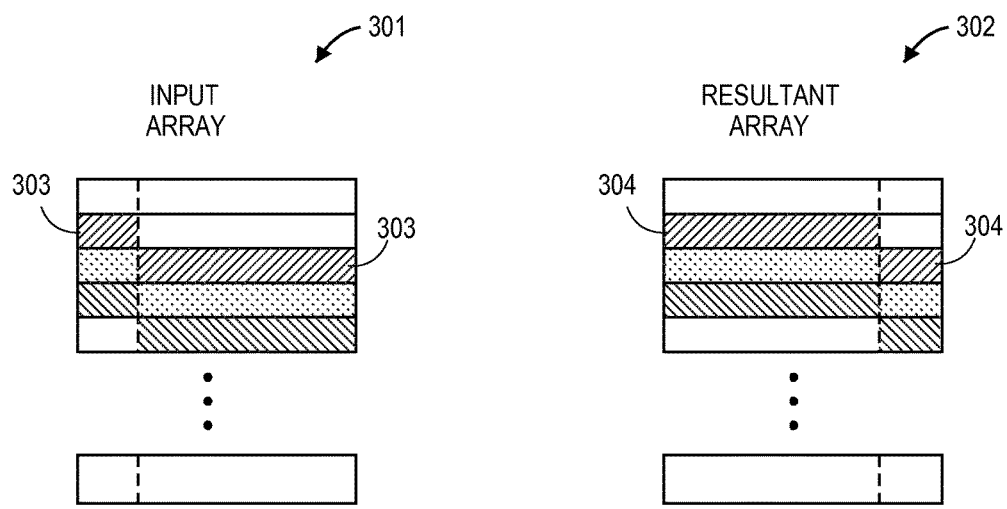
FIGS. 3a and 3b depict processing of an array having misaligned rows.

FIG. 3a shows a problem or inefficiency that can arise when the rows of an array are "misaligned" with respect to the memory addressing space. FIG. 3a shows an exemplary input array structure 301 and an exemplary "resultant" array structure 302. Here, each rectangular row observed in FIG. 3a corresponds to a vector register where a single memory read may fill one or more such vector registers. Ideally, the rows of the array are aligned on the vector register edges. Note, however, that the row's worth of information 303, 304 are misaligned within their respective array structures 301, 302. That is, the rows do not start/end on the normal vector boundaries but rather start/end within them. Moreover, both rows 303, 304 have different degrees of misalignment.

Vector processors and their compilers may exhibit inefficiencies when tasked with processing arrays having misaligned vector rows. More specifically, misaligned accesses are inefficient because they can cause multiple reads from memory for a single row of input data for computation and/or they can cause multiple writes to memory for a single row of resultant data.

Figure 3B:
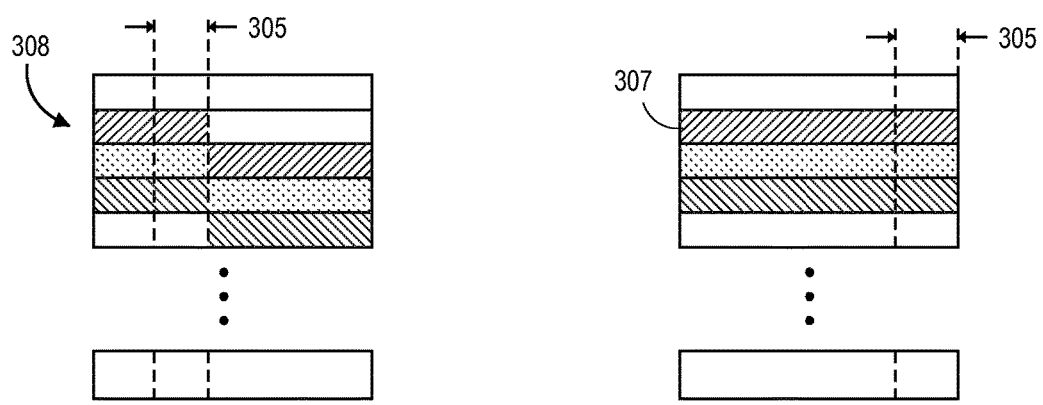

Present day compilers seek to reduce the penalty associated with misaligned array accessing through a technique called "peeling" that scrolls through multiple iterations until an aligned resultant row is reached. As a consequence of the peeling, the array structure will be aligned as in FIG. 3b. Here, the start position of both the input and resultant arrays have been shifted by the same amount 305 with the amount of shift causing the resultant row 307 to be aligned with the machine's nominal vector boundaries. With the resultant 307 being aligned, multiple writes to memory to write a single resultant row are avoided. However, because the input and resultant rows were misaligned with respect to one another, the input rows 308 are still misaligned. Thus multiple reads from memory are still possible to obtain a row of information for computation and the processor may continue to operate in an inefficient fashion.

Figure 4:
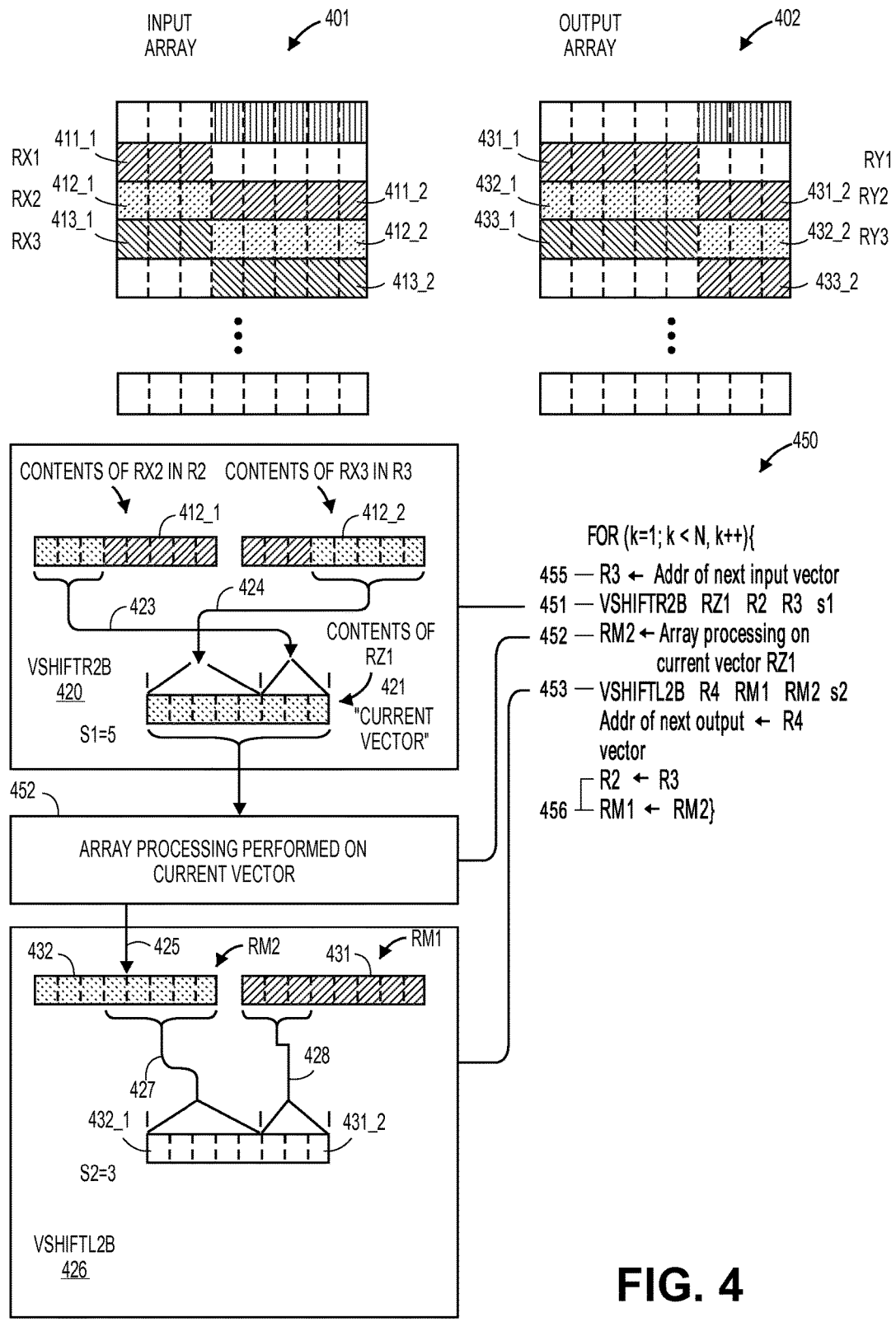
FIG. 4 shows an improved method of processing an array having misaligned rows.

FIG. 4 shows an improved approach that utilizes software pipelining and a pair of specially adapted instructions. The use of software pipelining with the special instructions provides for efficient processing of arrays having misaligned rows without penalty of misaligned accesses from/to memory. Here, the boundaries of the array rows are kept internal to the pipeline loop rather than being exposed at the memory access interface. As a consequence, the input data called from memory is aligned to the machine's vector boundaries rather than the boundaries of the misaligned rows. Input data can therefore be fetched by way of aligned memory accesses even though the rows of the array being processed are misaligned. Likewise, resultant data can be written to memory in an aligned fashion even though the resultant array rows are misaligned. The degree of misalignment as between the input rows and the resultant rows can also be different.

As observed in FIG. 4, an input array structure 401 contains a series of misaligned rows to be processed 411, 412, 413 which will produce resultant rows 431, 432, 433 in an output array 402 in response to the array processing. For simplicity the example of FIG. 4 refers only to accesses to/from vector register space. It will be apparent to those of ordinary skill that, even though only vector register space is referred to in the example of FIG. 4, the aligned addressing manner discussed herein can eliminate unaligned memory accesses as discussed just above.

In a basic implementation, each segment of the input array structure 401 corresponds to a unique vector register within vector register space (each having its own respective register address). As depicted in FIG. 4: 1) a leading section 411_1 of input row 411 is kept in register RX1; 2) a trailing section 411_2 of input row 411 and a leading section 412_1 of input row 412 are contained in register RX2; and, 3) a trailing section 412_2 of input row 412 and a leading section 413_1 of input row 413 are contained in register RX3; etc. Likewise, also as depicted in FIG. 4: 1) a leading section 431_1 of resultant row 431 is kept in register RY1; 2) a trailing section 431_2 of resultant row 431 and a leading section 432_1 of resultant row 432 are contained in register RY2; and, 3) a trailing section 432_2 of resultant row 432 and a leading section 433_1 of resultant row 433 are contained in register RY3; etc. Note that in the particular example of FIG. 4 the alignment of the rows in the input array 401 are different than the alignment of the rows in the output array 402.

The software pipeline loop can be structured as observed within inset 450 which shows the two new instructions VSHIFTR2B 451, VSHIFTL2B 453, between whatever code sequence 452 is utilized to perform the array processing on each row in the array. A unique feature of both the VSHIFTR2B instruction 451 and the VSHIFTL2B instruction 453 is that both instructions accept two source vector source operands and a third input operand that, in some way, specifies the misalignment within the array, which, in turn, specifies the amount of shifting and integration of content from the two vector source operands into a single resultant vector. In the example of FIG. 4, the third input operand is depicted as scalar input S1. As will be described in more detail below, the third input operand may take other forms such as a mask input vector.

For simplicity, in order to demonstrate the software pipelined loop, the present discussion assumes that row 411 has just been processed and the next iteration of the software pipeline loop begins with the processing of row 412. Notably, in order to have already processed row 411, the contents of register RX2 must have already been read on the previous iteration. Additionally, register RX2 includes a leading portion 412_1 of row 412. Here, at the start of processing of row 412, the contents of register RX2 including leading portion 412_1 are presumed to be in the contents of R2 as specified in the pseudo code 450. Additionally, as part of loop initialization a scalar value S1 is used to define the amount of misalignment that exists within the rows of input array 401.

Thus, according to the pseudo-code 450, the contents of RX3 which includes the trailing portion 412_2 of row 412 are read 455 into R3. Then the VSHIFTR2B instruction is executed 451 taking R2, R3 and S1 as input operands and storing the result in RZ1.

The execution of the VSHIFTR2B instruction 451 is depicted graphically at inset 420. As depicted at inset 420, execution of the VSHIFTR2B instruction 451 will: 1) shift 423 the last three elements of the contents of register R2 five element locations to the right to align the rightmost edge of row 412 to the rightmost edge of the register space; 2) append 424 the first five elements locations of register R3 to the leftmost edge of the shifted elements of R2. Thus, the resultant of the VSHIFTR2B instruction in RZ1, also referred to as the "current vector" 421, corresponds to an aligned version of input row 412. Note that in this example, there are eight elements per vector. S1 can be defined as 3 or 5 given the misalignment depicted in the input array depending on design choice.

RZ1 is then used as an input source operand for the array processing sequence 452. Array processing sequence 452 writes 425 its resultant 432 into RM2. The resultant 432 is a fully aligned row of resultant data 432, a leading section 432_1 of which is to be written into the output array 402 at register RY2 along with a trailing section 431_2 of resultant 431. Here, note that the processing of the prior cycle for previous row 411 produced aligned row 431 as its resultant. Aligned resultant 431 is presently stored in RM1 as a consequence of operation 456 performed during the previous loop cycle.

The VSHIFTL2B instruction is then executed 453. The operation of the VSHIFTL2B instruction is graphically depicted at inset 426. As observed at inset 426, the VSHIFTL2B instruction accepts the two resultants 431, 432 and the scalar S2 input as source operands. The scalar input S2 specifies the misalignment in the resultant array 402. Note that the misalignment in the resultant array 402 is different than in the input array 401. That is, whereas the misalignment of the input array 401 corresponds to five vector element locations (e.g., S1=5), the misalignment of the output array 402 corresponds to three vector element locations (e.g., S2=3). As such S1 and S2 take on different values in the example of FIG. 4.

From these input operands the VSHIFTL2B instruction will: 1) shift 427 the first five element locations of the second resultant 432 in RM2 three element locations to the left; and, 2) append 428 the last three elements of the first resultant 431 in RM1 to the right most edge of the shifted elements of the second resultant 432. These activities form properly misaligned data content of two different output rows that can be stored into the resultant array 402 (at register RC=RY2) by way of an aligned access.

The contents of R3 are then moved into R2 and the contents of RM2 are moved into RM1 as a consequence of process 456.

It should be clear from the discussion above that the processing described above can sequentially commence to the next register RX4 in the input array 401 and the results will be sequentially written into the output array at RY3 as output resultant 432_2, 433_1 as an aligned access. Thus an entire array can be processed in this fashion. Noteworthy, as seen from the scheme of software pipeline 450, on each iteration only one aligned vector load 455 is used per memory read access and only one aligned vector store 458 is used per memory write access. In general case, number of aligned memory loads and stores per iteration of software pipeline loop is equal to number of memory read and write accesses respectively.

The flow discussed above can be regarded as a software pipelined loop at least because data content from a previous iteration (e.g., content of register RM1) is used by a subsequent iteration (e.g., the formation of the output vector 431_2, 432_1). Some loop initialization (not depicted) may be performed to initialize the loop. In an embodiment, the loop initialization defines the scalars S1 and S2 as well as perform a masked read for the first input vector to be processed (which only captures the leading portion of the first row of the input array) and then reads the second input vector to be processed. The loop initialization continues to execute a VSHIFTR2B instruction to form a first current vector which is subsequently processed by the array processing sequence 452. The result will be a first output row. The loop initialization continues to execute a VSHIFTL2B instruction to form a first resultant containing a leading section of the first row of the output array which is subsequently masked stored to the output array and then moved into RM1. The contents of the second input vector that was read are shifted in R2. At this point the software pipelined loop is ready to operate as discussed at length with respect to FIG. 4. There may also be an epilog routine that is performed at the very end after the last loop iteration that performs a masked write into the vector register space of the trailing portion of the last row of the output array.

For simplicity the misalignment in the output vector 402, S2, was regarded as an input condition to the loop itself. It is possible that such misalignment could result from the array processing 452 and is specified as another resultant of that processing 452 that is provided to the VSHIFTL2B instruction 453 (i.e., process 452 defines S2). Moreover, note that in some cases the output array may be written to with the output vectors being aligned. In that case the resultant of process 452 may be written into the output array 402 without any execution of the VSHIFTL2B instruction.

In an alternate embodiment, rather than a scalar value S, the VSHIFTR2B and VSHIFTL2B instructions employ a mask value k to specify the shift control information. Here, for the VSHIFTR2B instruction, the number of masked bits of the mask may be used to specify scalar shift control S, (e.g., 11100000 in the example of the VSHIFTR2B instruction of FIG. 4 S=5).

This embodiment can be described by the following pseudocode, where KL is a number of elements in a vector:

```
VSHIFTR2B zmmdest,zmmsrc1,zmmsrc2,k1
s=zerocnt(k1) //count number of zeros in k1
for(i=0; i<KL-s; i++){
    zmmdest[i] = zmmsrc1[i+s];
}
for( ; i<KL; i++){
    zmmdest[n] = zmmsrc2[i-KL+s];
}
```

Alternatively, the number of unmasked bits of the input mask may be used to specify shift control S.

Likewise, for the VSHIFTL2B instruction, the masked bits of the mask value may specify, e.g., scalar shift control S (e.g., 11111000 in the example of the VSHIFTL2B instruction of FIG. 4 shift control S=3).

```
VSHIFTL2B zmmdest,zmmsrc1,zmmsrc2,k1
s=zerocnt(k1) //compute number of zeros in k1
for(i=0; i<s; i++){
    zmmdest[i] = zmmsrc1[i+KL-s];
}
for( ; i<KL; i++){
    zmmdest[i] = zmmsrc2[i-s];
}
```

Other mask value schemes may be utilized to provide the shift control information. The logical inversion can be accomplished with another instruction added to the instruction sequence 450 of FIG. 4.

With the described above instructions the example vector loop for (i=0; i<N; i+=KL) B[i+KL−1:i]=computation(A[i+KL−1:i]) can be vectorized while eliminating unaligned memory accesses in the following way:

```
//prolog of SWP
rax=A%VL  //determine alignment of A
r8 =A-rax  //nearest to A aligned address
rbx=B%VL  //determine alignment of B
r9 = B-rbx  //nearest to B aligned address
k3=(1<<rax-1)  //mask with alignment of A
k1=knot(k3)  //mask for first load of A, inverse of k3
k4=(1<<rbx-1)  //mask with alignment of B
k2=knot(k4)  //mask for first store of B, inverse of k4
vpxor zmm_res1,zmm_res1,zmm_res1  //zmm_res1=0
vmovdqa8 zmm_in1{k1},[r8]  //load first aligned vector by mask k1 (not full)
vmovdqa8 zmm_in2, [r8+VL]  //load second aligned vector (full)
vshiftr2b zmm_cur,zmm_in1,zmm_in2, k1  //construct current vector to compute
zmm_res2=computation(zmm_cur)  //do vector computation
vshiftl2b zmm_out,zmm_res1,zmm_res2, k2  //construct output vector
vmovdqa8 [r9]{k2},zmm_out  //store output vector to aligned location by mask k2
//(not full)
zmm_in1 = zmm_in2    //preserve values for the next
zmm_res1 = zmm_res2   //vector iteration
//pipeline is loaded, start the main loop
for(i=KL, rcx=VL; i<N; i+=KL, rcx+=VL){  //1 vector (KL elements, VL bytes) is
//already computed
vmovaps zmm_in2, [r8+rcx+VL]  //aligned load of next vector
vshiftr2b zmm_cur,zmm_in1,zmm_in2, k1  //construct current vector to compute
zmm_res2=computation(zmm_cur)  //do vector computation
vshiftl2b zmm_out,zmm_res1,zmm_res2, k2  //construct output vector
vmovaps [r9+rcx],zmm_out  //aligned store of output vector
zmm_in1 = zmm_in2    //preserve values for the next
zmm_res1 = zmm_res2   //vector iteration
}
//epilog
vmovaps [r9+rcx]{k4},zmm_out  //aligned store of the last elements of the last
//output vector to B, use k4 mask not to write outside array boundary
Noteworthy that for shift instructions used the same masks as used for loads and
stores of the firsts input and output vectors respectively.
```

Figure 5A:
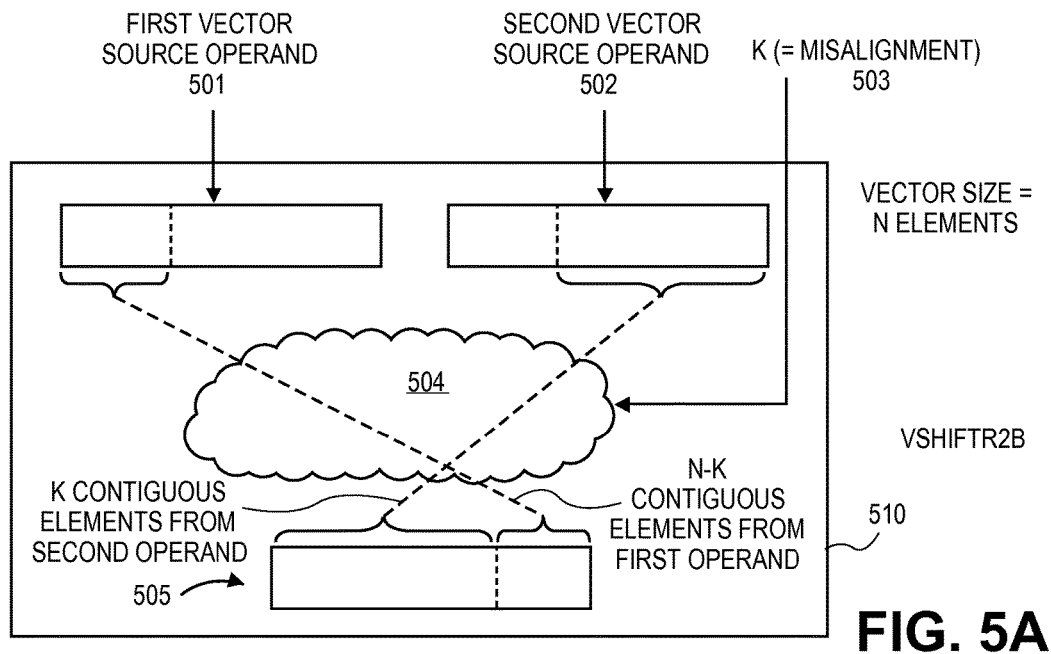
FIG. 5a shows a design for a first instruction used in the process of FIG. 4.
Figure 5B:
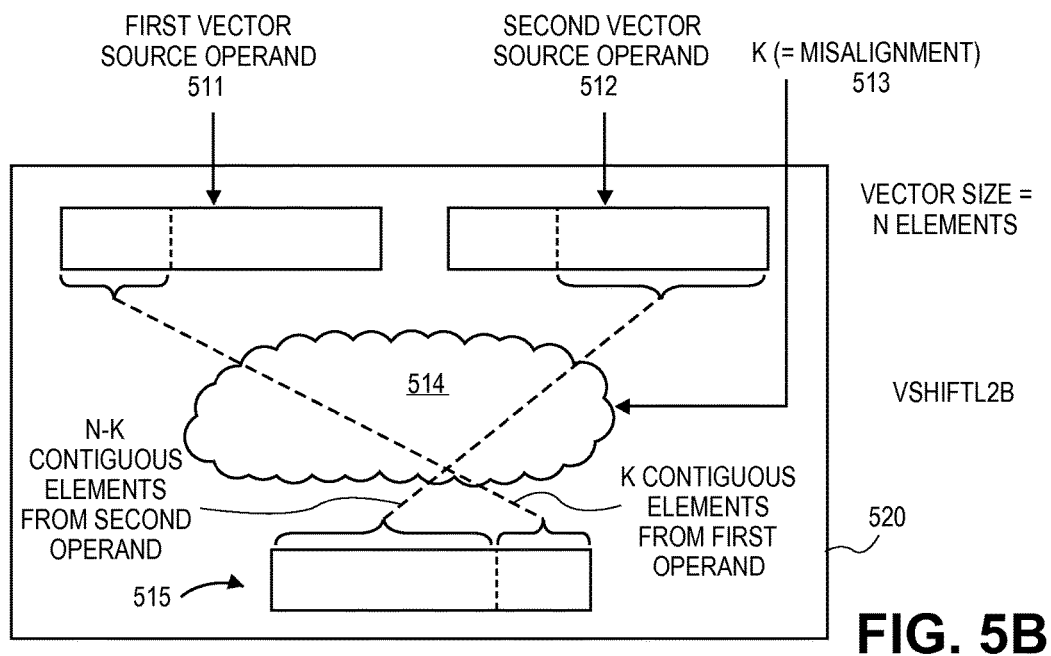
FIG. 5b shows a design for a second instruction used in the process of FIG. 4.

FIGS. 5a and 5b show depictions of circuit designs for instruction execution pipeline functional units 510, 520 capable of executing VSHIFTR2B and VSHIFTL2B instructions, respectively. As observed in FIG. 5a, the VSHIFTR2B functional unit 510 accepts first and second input vector operands 501, 502. Here, the input vector operands 501, 502 are of size N elements. Another input 503 specifies an operation to be performed by the functional unit 510 where an N–K contiguous element section of the first input operand 501 and a K contiguous element section of the second source operand 502 will be selected for inclusion in the resultant 505. As discussed at length above, the content received at input 503 may specify misalignment within a data array.

Input 503 is used to control a switching network 504 that may be built, as just one example, with multiplexer circuitry. In operation the actual control applied to switching network 504 via input 503 may be derived from a third input operand that is specified in the instruction's instruction format. For example, after the instruction is decoded a series of micro-ops may be issued to or generated within the functional unit to set-up the proper switching control of switching network 504. Alternatively, an opcode and the third input operand may be applied to the switching network 504 directly via input 503. The third input operand may take the form of a (e.g., mask) vector or scalar within the instruction format. In the case of a scalar, the scalar value may be articulated in the instruction format as an immediate operand or may be called in from other scalar register space (e.g., control register space where, e.g., conditional branching information is kept). Alternatively a vector operand may actually be called in by the instruction but the scalar value is understood to occupy one of the vector's data elements.

Regardless of implementation, the switching network 504 places N–K continuous elements from the upper border of the first source operand 501 into the leading edge of the resultant 505, and, appends within the resultant K contiguous elements from the lower border of the second source operand 502 to the trailing edge of the N—K elements that are selected from the first source operand.

The instruction may execute entirely in parallel (all vector elements are processed simultaneously in parallel), entirely in serial fashion (elements are selected for inclusion in the resultant on an element-by-element basis) or some combination between these two approaches.

In a further embodiment, the granularity of the operation performed by the functional unit 510 is made configurable so that the operation can be performed upon vector source operands of different element number sizes. In this case, N is another variable of the instruction that, e.g., may be specified in an immediate operand of the instruction.

As observed in FIG. 5b, the VSHIFTL2B functional unit 520 accepts first and second input vector operands 511, 512. Here, the input vector operands 511, 512 are of size N elements. Another input 513 specifies an operation to be performed by the functional unit 510 where a K contiguous element upper section of the first input operand 511 and an N—K contiguous element lower section of the second source operand 512 will be selected for inclusion in the resultant 515. As discussed at length above, the content received at input 513 may specify misalignment within a data array.

Input 513 is used to control a switching network 514 that may be built, as just one example, with multiplexer circuitry. In operation the actual control applied to switching network 514 via input 513 may be derived from a third input operand that is specified in the instruction's instruction format. For example, after the instruction is decoded a series of micro-ops may be issued to or generated within the functional unit to set-up the proper switching control of switching network 514. Alternatively, an opcode and the third input operand may be applied to the switching network 514 directly via input 513. The third input operand may take the form of a (e.g., mask) vector or scalar within the instruction format. In the case of a scalar, the scalar value may be articulated in the instruction format as an immediate operand or may be called in from other scalar register space (e.g., control register space where, e.g., conditional branching information is kept). Alternatively a vector operand may actually be called in by the instruction but the scalar value is understood to occupy one of the vector's data elements.

Regardless of implementation, the switching network 514 places upper K continuous elements from the first source operand 511 into the leading edge of the resultant 515, and, appends within the resultant lower N−K contiguous elements from the second source operand 512 to the trailing edge of the K elements that are selected from the first source operand.

The instruction may execute entirely in parallel (all vector elements are processed simultaneously in parallel), entirely in serial fashion (elements are selected for inclusion in the resultant on an element-by-element basis) or some combination between these two approaches.

In a further embodiment, the granularity of the operation performed by the functional unit 511 is made configurable so that the operation can be performed upon vector source operands of different element number sizes. In this case, N is another variable of the instruction that, e.g., may be specified in an immediate operand of the instruction.

Note that the operations described above in FIGS. 5a and 5b could be combined into a same functional unit. In various embodiments, the opcode of either or both of these instructions corresponds to an operation that can only move contiguous groups of elements from the two source vector operands into the resultant as discussed above. That is, the instruction can not be used to move a non contiguous group of elements from either source operand into the resultant. If only a single element is to be moved into the resultant from one of the source operands, that single element can be regarded as being "contiguous" consistent with the operation of the instruction as described herein.

Figure 5C:
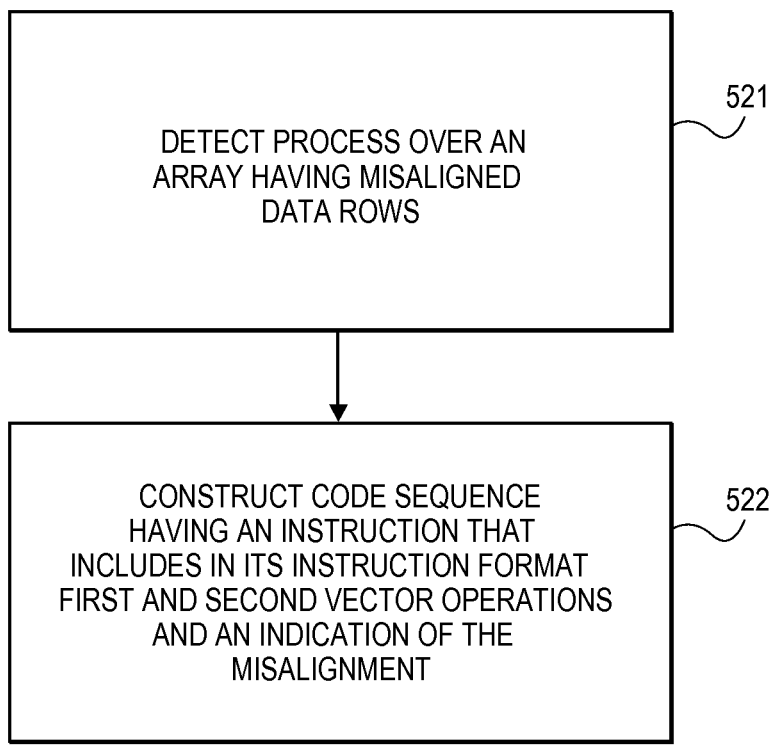
FIG. 5c shows a compilation process.

FIG. 5c shows a compilation process that can be performed by a compiler (e.g., a compiler that is constructing object code targeted to a processor having a specific instruction set architecture). According to the process of FIG. 5, the compiler detects processing performed on an array having misaligned data rows 521. In response to the detection, the compiler constructs the code sequence that performs the array processing to include an instruction that has in its instruction format first and second vector operands and a third input operand that specifies the misalignment 522. In an embodiment, a peeling process is not used to construct the code.

Embodiments of the instruction(s) detailed above may be at least partially embodied in a "generic vector friendly instruction format" which is detailed below. Additionally, exemplary systems, architectures, and pipelines are detailed below. Embodiments of the instruction(s) above may be executed on such systems, architectures, and pipelines, but are not limited to those detailed.

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6A:
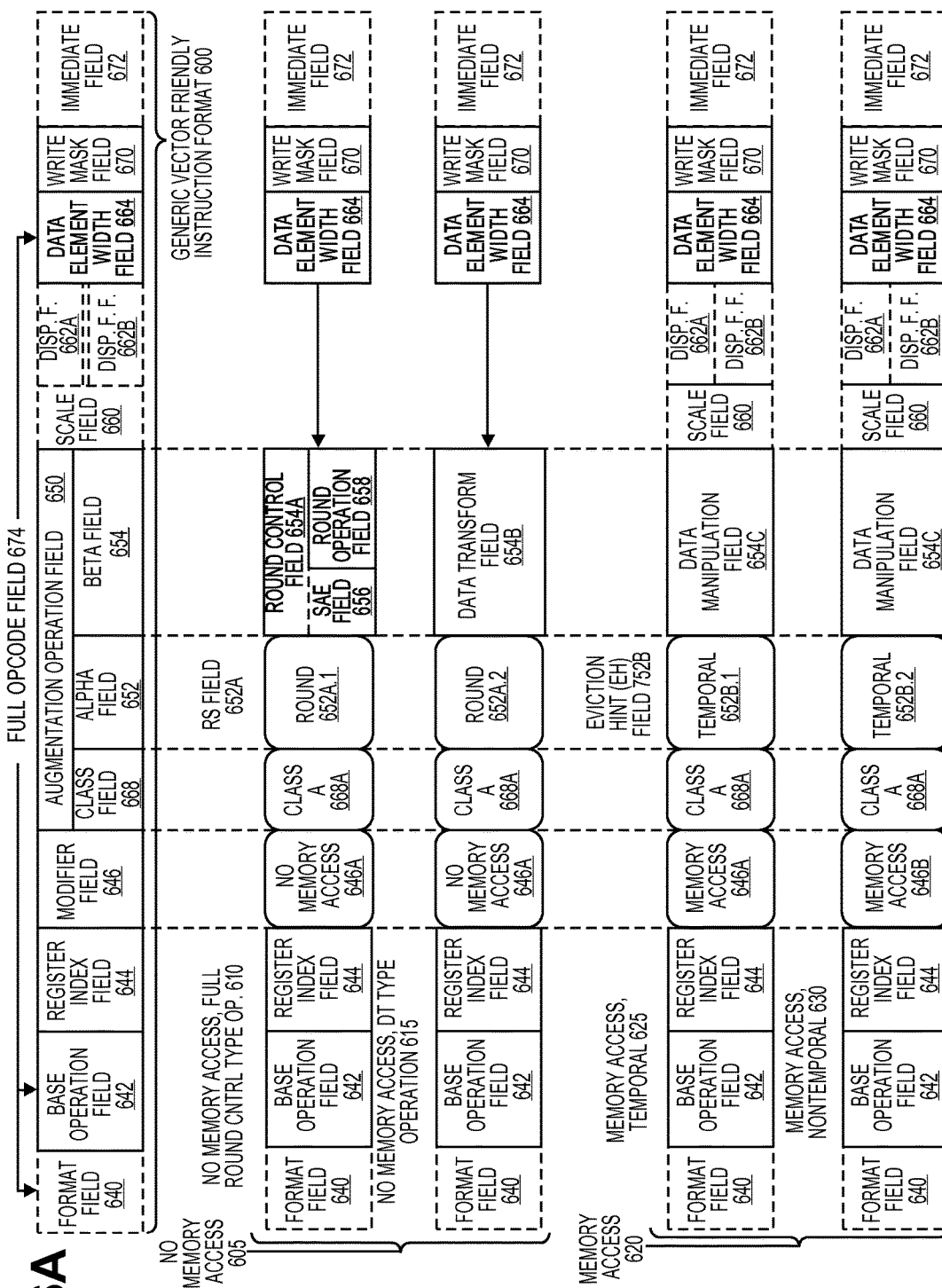
FIG. 6a is a block diagram illustrating a generic vector friendly instruction format and class A instruction templates thereof according to embodiments of the invention.
Figure 6B:
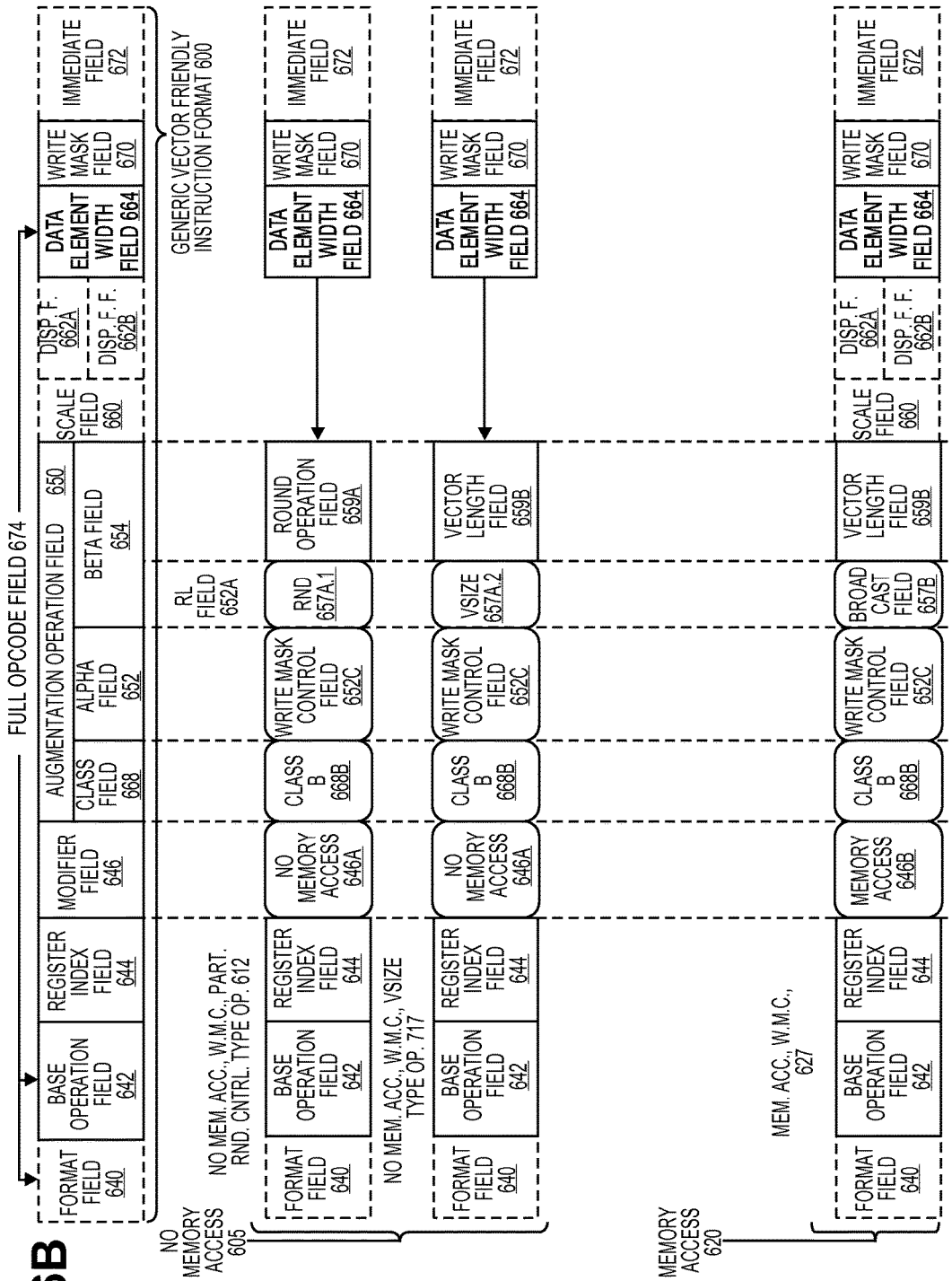
FIG. 6b is a block diagram illustrating the generic vector friendly instruction format and class B instruction templates thereof according to embodiments of the invention.
Figure 7D:
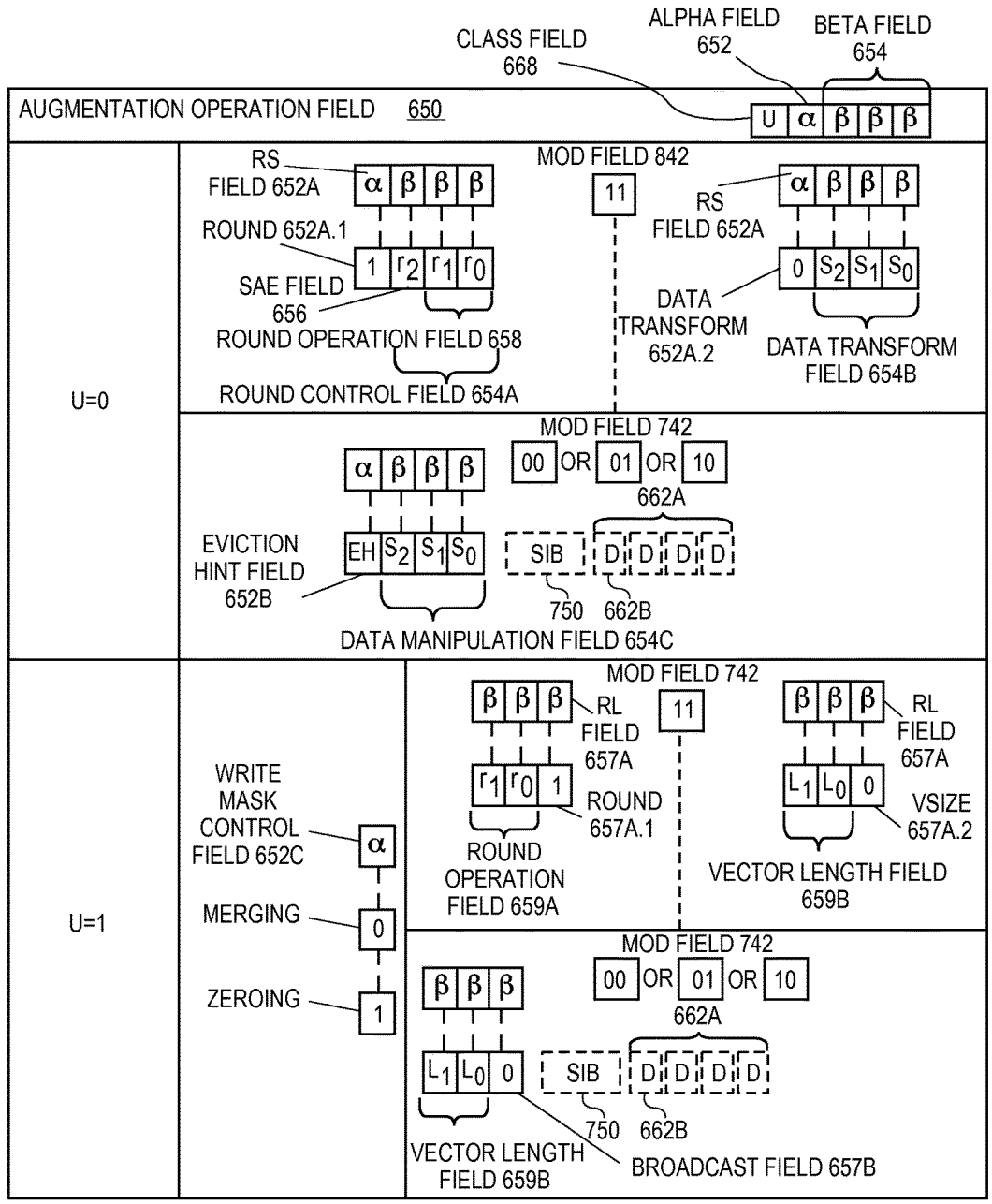

Exemplary Generic Vector Friendly Instruction Format—FIG. 6A-B

FIGS. 6A-B are block diagrams illustrating a generic vector friendly instruction format and instruction templates thereof according to embodiments of the invention. FIG. 6A is a block diagram illustrating a generic vector friendly instruction format and class A instruction templates thereof according to embodiments of the invention; while FIG. 6B is a block diagram illustrating the generic vector friendly instruction format and class B instruction templates thereof according to embodiments of the invention. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set. While embodiments will be described in which instructions in the vector friendly instruction format operate on vectors that are sourced from either registers (no memory access 605 instruction templates) or registers/memory (memory access 620 instruction templates), alternative embodiments of the invention may support only one of these. Also, while embodiments of the invention will be described in which there are load and store instructions in the vector instruction format, alternative embodiments instead or additionally have instructions in a different instruction format that move vectors into and out of registers (e.g., from memory into registers, from registers into memory, between registers). Further, while embodiments of the invention will be described that support two classes of instruction templates, alternative embodiments may support only one of these or more than two.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 656 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

Format

The generic vector friendly instruction format 600 includes the following fields listed below in the order illustrated in FIGS. 6A-B. In conjunction with the discussions above concerning FIGS. 4, 5a and 5b, in an embodiment, referring to the format details provided below in FIGS. 6A-B and 7, either a non memory access instruction type 605 or a memory access instruction type 620 may be utilized. Addresses for the input vector operand(s) and destination may be identified in register address field 644 described below. The instructions may be formatted to be destructive or non destructive.

Format field 640—a specific value (an instruction format identifier value) in this field uniquely identifies the vector friendly instruction format, and thus occurrences of instructions in the vector friendly instruction format in instruction streams. Thus, the content of the format field 640 distinguish occurrences of instructions in the first instruction format from occurrences of instructions in other instruction formats, thereby allowing for the introduction of the vector friendly instruction format into an instruction set that has other instruction formats. As such, this field is optional in the sense that it is not needed for an instruction set that has only the generic vector friendly instruction format.

Base operation field 642—its content distinguishes different base operations. As described later herein, the base operation field 642 may include and/or be part of an opcode field.

Register index field 644—its content, directly or through address generation, specifies the locations of the source and destination operands, be they in registers or in memory. These include a sufficient number of bits to select N registers from a PxQ (e.g. 32x1012) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination). While in one embodiment P=32, alternative embodiments may support more or less registers (e.g., 16). While in one embodiment Q=1012 bits, alternative embodiments may support more or less bits (e.g., 128, 1024).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the invention, this field is divided into a class field 668, an alpha field 652, and a beta field 654. The augmentation operation field allows common groups of operations to be performed in a single instruction rather than 2, 3 or 4 instructions. Below are some examples of instructions (the nomenclature of which are described in more detail later herein) that use the augmentation field 650 to reduce the number of required instructions.

| Prior Instruction Sequences | Instructions Sequences according to on Embodiment of the Invention |
|---|---|
| vaddps ymm0, ymm1, ymm2 | vaddps zmm0, zmm1, zmm2 |
| vpshufd ymm2, ymm2, 0x55<br>vaddps ymm0, ymm1, ymm2 | vaddps zmm0, zmm1, zmm2 {bbbb} |
| vpmovsxbd ymm2, [rax]<br>vcvtdq2ps ymm2, ymm2<br>vaddps ymm0, ymm1, ymm2 | vaddps zmm0, zmm1, [rax]{sint8} |
| vpmovsxbd ymm3, [rax]<br>vcvtdq2ps ymm3, ymm3<br>vaddps ymm4, ymm2, ymm3<br>vblendvps ymm1, ymm5, ymm1, ymm4 | vaddps zmm1{k5}, zmm2, [rax]{sint8} |
| vmaskmovps ymm1, ymm7, [rbx] | vmovaps zmm1 {k7}, [rbx] |
| vbroadcastss ymm0, [rax]<br>vaddps ymm2, ymm0, ymm1<br>vblendvps ymm2, ymm2, ymm1, ymm7 | vaddps zmm2{k7}{z}, zmm1, [rax]{1toN} |

Where [rax] is the base pointer to be used for address generation, and where { } indicates a conversion operation specified by the data manipulation filed (described in more detail later here).

Scale field 660—its content allows for the scaling of the index field's content for memory address generation (e.g., for address generation that uses $2^{scale}*$index+base).

Displacement Field 662A—its content is used as part of memory address generation (e.g., for address generation that uses $2^{scale}*$index+base+displacement).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C as described later herein. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. Also, this masking can be used for fault suppression (i.e., by masking the destination's data element positions to prevent receipt of the result of any operation that may/will cause a fault—e.g., assume that a vector in memory crosses a page boundary and that the first page but not the second page would cause a page fault, the page fault can be ignored if all data element of the vector that lie on the first page are masked by the write mask). Further, write masks allow for "vectorizing loops" that contain certain types of conditional statements. While embodiments of the invention are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed. Further, zeroing allows for performance improvements when: 1) register renaming is used on instructions whose destination operand is not also a source (also call non-ternary instructions) because during the register renaming pipeline stage the destination is no longer an implicit source (no data elements from the current destination register need be copied to the renamed destination register or somehow carried along with the operation because any data element that is not the result of operation (any masked data element) will be zeroed); and 2) during the write back stage because zeros are being written.

Immediate field 672—its content allows for the specification of an immediate. This field is optional in the sense that is it not present in an implementation of the generic vector friendly format that does not support immediate and it is not present in instructions that do not use an immediate.

Instruction Template Class Selection

Figure 2A:
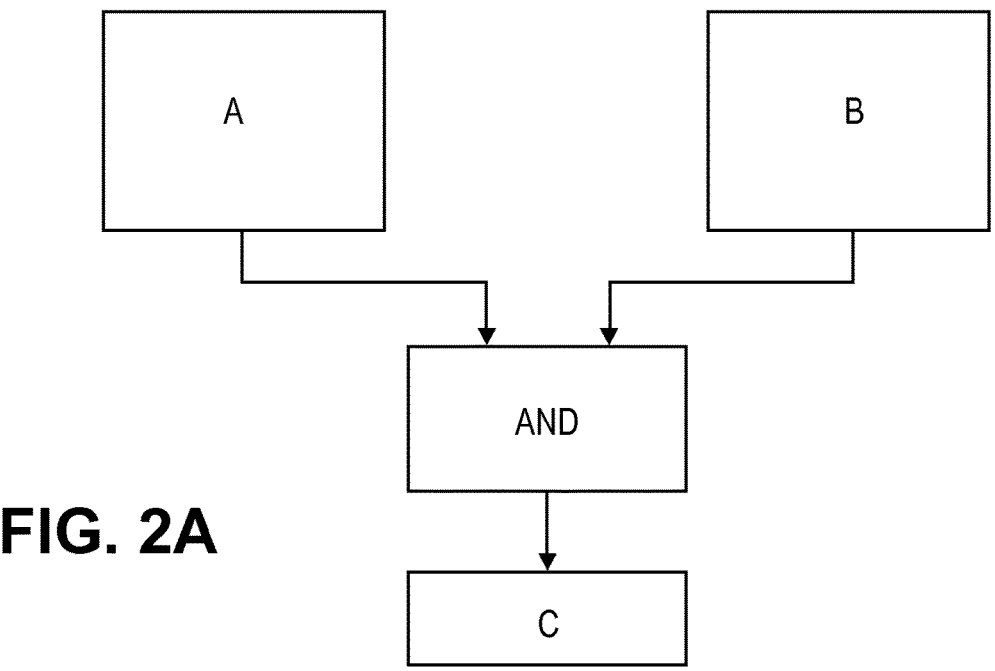
Figure 2B:
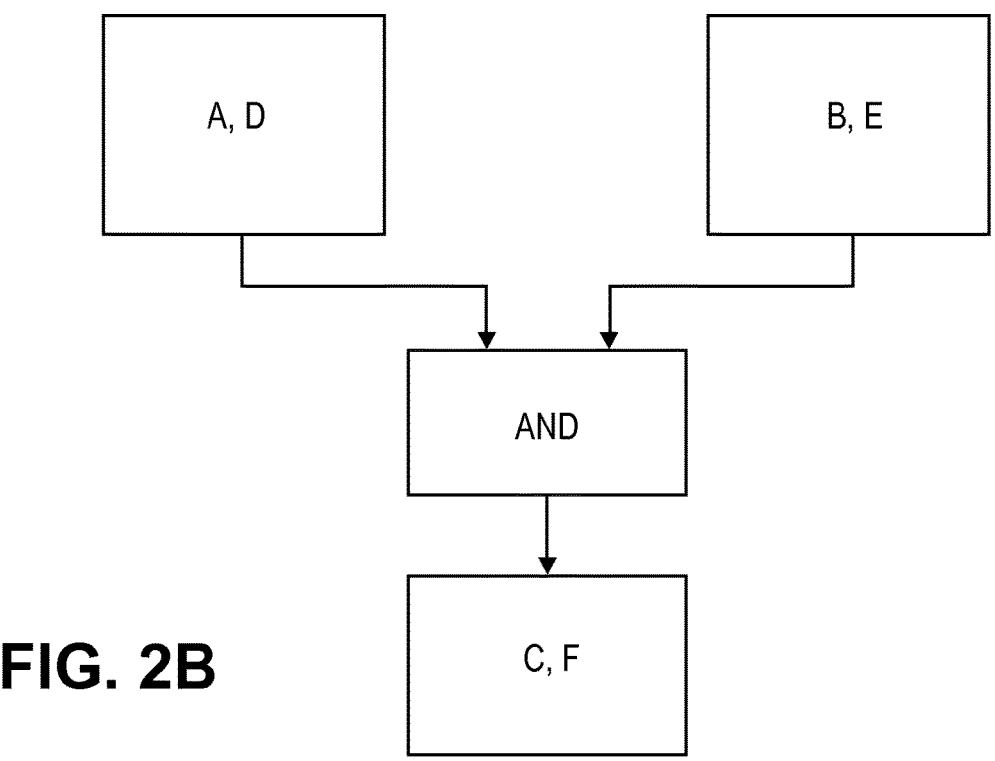

Class field 668—its content distinguishes between different classes of instructions. With reference to FIGS. 2A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

No-Memory Access Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In FIG. 6, rounded corner blocks are used to indicate a specific value is present (e.g., no memory access 646A in the modifier field 646; round 652A.1 and data transform 652A.2 for alpha field 652/rs field 652A). In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the invention the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis, and thus is particularly useful when this is required. In one embodiment of the invention where a processor includes a control register for specifying rounding modes, the round operation control field's 650 content overrides that register value (Being able to choose the rounding mode without having to perform a save-modify-restore on such a control register is advantageous).

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

Memory Access Instruction Templates of Class a

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector Memory Instructions perform vector loads from and vector stores to memory, with conversion support. As with regular vector instructions, vector memory instructions transfer data from/to memory in a data element-wise fashion, with the elements that are actually transferred dictated by the contents of the vector mask that is selected as the write mask. In FIG. 6A, rounded corner squares are used to indicate a specific value is present in a field (e.g., memory access 646B for the modifier field 646; temporal 652B.1 and non-temporal 652B.2 for the alpha field 652/eviction hint field 652B).

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

No-Memory Access Instruction Templates of Class B

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In FIG. 6, rounded corner blocks are used to indicate a specific value is present (e.g., no memory access 646A in the modifier field 646; round 657A.1 and VSIZE 657A.2 for the RL field 657A). In the no memory access 605 instruction templates, the scale field 660, the displacement field 662A, and the displacement scale filed 662B are not present.

No-Memory Access Instruction Templates—Write Mask Control, Partial Round Control Type Operation In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis, and thus is particularly useful when this is required. In one embodiment of the invention where a processor includes a control register for specifying rounding modes, the round operation control field's 650 content overrides that register value (Being able to choose the rounding mode without having to perform a save-modify-restore on such a control register is advantageous).

No Memory Access Instruction Templates—Write Mask Control, VSIZE Type Operation

In the no memory access, write mask control, VSIZE type operation 617 instruction template, the rest of the beta field 654 is interpreted as a vector length field 659B, whose content distinguishes which one of a number of data vector length is to be performed on (e.g., 128, 856, or 1012 byte).

Memory Access Instruction Templates of Class B

In the case of a memory access 620 instruction template of class A, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

Additional Comments Regarding Fields

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code.

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The instruction format requires a relatively small number of bits because it reuses different fields for different purposes based on the contents of other fields. For instance, one perspective is that the modifier field's content chooses between the no memory access 605 instructions templates on FIGS. 6A-B and the memory access 6250 instruction templates on FIGS. 6A-B; while the class field 668's content choses within those non-memory access 605 instruction templates between instruction templates 610/615 of FIG. 6A and 612/617 of FIG. 6B; and while the class field 668's content chooses within those memory access 620 instruction templates between instruction templates 625/830 of FIG. 6A and 627 of FIG. 6B. From another perspective, the class field 668's content chooses between the class A and class B instruction templates respectively of FIGS. 6A and B; while the modifier field's content chooses within those class A instruction templates between instruction templates 605 and 620 of FIG. 6A; and while the modifier field's content chooses within those class B instruction templates between instruction templates 605 and 620 of FIG. 6B. In the case of the class field's content indicating a class A instruction template, the content of the modifier field 646 chooses the interpretation of the alpha field 652 (between the rs field 652A and the EH field 652B. In a related manner, the contents of the modifier field 646 and the class field 668 chose whether the alpha field is interpreted as the rs field 652A, the EH field 652B, or the write mask control (Z) field 652C. In the case of the class and modifier fields indicating a class A no memory access operation, the interpretation of the augmentation field's beta field changes based on the rs field's content; while in the case of the class and modifier fields indicating a class B no memory access operation, the interpretation of the beta field depends on the contents of the RL field. In the case of the class and modifier fields indicating a class A memory access operation, the interpretation of the augmentation field's beta field changes based on the base operation field's content; while in the case of the class and modifier fields indicating a class B memory access operation, the interpretation of the augmentation field's beta field's broadcast field 657B changes based on the base operation field's contents. Thus, the combination of the base operation field, modifier field and the augmentation operation field allow for an even wider variety of augmentation operations to be specified.

The various instruction templates found within class A and class B are beneficial in different situations. Class A is useful when zeroing-writemasking or smaller vector lengths are desired for performance reasons. For example, zeroing allows avoiding fake dependences when renaming is used since we no longer need to artificially merge with the destination; as another example, vector length control eases store-load forwarding issues when emulating shorter vector sizes with the vector mask. Class B is useful when it is desirable to: 1) allow floating point exceptions (i.e., when the contents of the SAE field indicate no) while using rounding-mode controls at the same time; 2) be able to use upconversion, swizzling, swap, and/or downconversion; 3) operate on the graphics data type. For instance, upconversion, swizzling, swap, downconversion, and the graphics data type reduce the number of instructions required when working with sources in a different format; as another example, the ability to allow exceptions provides full IEEE compliance with directed rounding-modes.

Exemplary Specific Vector Friendly Instruction Format

FIG. 7 is a block diagram illustrating an exemplary specific vector friendly instruction format according to embodiments of the invention. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understand that although embodiments of the invention are described with reference to the specific vector friendly instruction format 700 in the context of the generic vector friendly instruction format 600 for illustrative purposes, the invention is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the invention is not so limited (that is, the generic vector friendly instruction format 600 contemplates other sizes of the data element width field 664). Format—FIG. 7

The generic vector friendly instruction format 600 includes the following fields listed below in the order illustrated in FIG. 7.

EVEX Prefix (Bytes 0-3)

EVEX Prefix 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in one embodiment of the invention).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]—R), EVEX.X bit field (EVEX byte 1, bit [6]—X), and 657BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field 710 and is the EVEX.R' bit field (EVEX Byte 1, bit [4]—R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]—vvvv)—the role of EVEX.vvvv may include the following: 1) EVEX.vvvv encodes the first source register operand, specified in inverted (1 s complement) form and is valid for instructions with 2 or more source operands; 2) EVEX.vvvv encodes the destination register operand, specified in 1 s complement form for certain vector shifts; or 3) EVEX.vvvv does not encode any operand, the field is reserved and should contain 1111 b. Thus, EVEX.vvvv field 720 encodes the 4 low-order bits of the first source register specifier stored in inverted (1 s complement) form. Depending on the instruction, an extra different EVEX bit field is used to extend the specifier size to 32 registers.

EVEX.U 668 Class field (EVEX byte 2, bit [2]—U)—If EVEX.U=0, it indicates class A or EVEX.U0; if EVEX.U=1, it indicates class B or EVEX.U1.

Prefix encoding field 725 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific. Additional description is provided later herein.

Beta field 654 (EVEX byte 3, bits [6:4]—SSS, also known as $EVEX.s_{2-0}$, $EVEX.r_{2-0}$, EVEX.rr1, EVEX.LL0, EVEX.LLB; also illustrated with βββ)—as previously described, this field is context specific. Additional description is provided later herein.

REX' field 710—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]—kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4)

This is also known as the opcode byte. Part of the opcode is specified in this field.

MOD R/M Field 740 (Byte 5)

Modifier field 646 (MODR/M.MOD, bits [7-6]-MOD field 742)—As previously described, the MOD field's 742 content distinguishes between memory access and non-memory access operations. This field will be further described later herein.

MODR/M.reg field 744, bits [5-3]—the role of ModR/M.reg field can be summarized to two situations: ModR/M.reg encodes either the destination register operand or a source register operand, or ModR/M.reg is treated as an opcode extension and not used to encode any instruction operand.

MODR/M.r/m field 746, bits [2-0]—The role of ModR/M.r/m field may include the following: ModR/M.r/m encodes the instruction operand that references a memory address, or ModR/M.r/m encodes either the destination register operand or a source register operand.

Scale, Index, Base (SIB) Byte (Byte 6)

Scale field 660 (SIB.SS, bits [7-6]—As previously described, the scale field's 660 content is used for memory address generation. This field will be further described later herein.

SIB.xxx 754 (bits [5-3] and SIB.bbb 756 (bits [2-0])—the contents of these fields have been previously referred to with regard to the register indexes Xxxx and Bbbb.

Displacement Byte(s) (Byte 7 or Bytes 7-10)

Displacement field 662A (Bytes 7-10)—when MOD field 742 contains 10, bytes 7-10 are the displacement field 662A, and it works the same as the legacy 32-bit displacement (disp32) and works at byte granularity.

Displacement Factor Field 662B (Byte 7)—when MOD Field 742 Contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset).

Immediate

Immediate field 672 operates as previously described.

Exemplary Register Architecture—FIG. 8

FIG. 8 is a block diagram of a register architecture 800 according to one embodiment of the invention. The register files and registers of the register architecture are listed below:

Vector register file 810—in the embodiment illustrated, there are 32 vector registers that are 812 bits wide; these registers are referenced as zmm0 through zmm31. The lower order 656 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
| --- | --- | --- | --- |
| Instruction Templates that do not include the vector length field 659B | A (FIG. 6A; U = 0) | 810, 615, 625, 630 | zmm registers (the vector length is 64 byte) |
| | B (FIG. 6B; U = 1) | 812 | zmm registers (the vector length is 64 byte) |

| Adjustable Vector Length | Class | Operations | Registers |
|---|---|---|---|
| Instruction Templates that do include the vector length field 659B | B (FIG. 6B; U = 1) | 817, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. As previously described, in one embodiment of the invention the vector mask register k0 cannot be used as a write mask; when the encoding that would normally indicate k0 is used for a write mask, it selects a hardwired write mask of 0xFFFF, effectively disabling write masking for that instruction.

Multimedia Extensions Control Status Register (MXCSR) 820—in the embodiment illustrated, this 32-bit register provides status and control bits used in floating-point operations.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Extended flags (EFLAGS) register 830—in the embodiment illustrated, this 32 bit register is used to record the results of many instructions.

Floating Point Control Word (FCW) register 835 and Floating Point Status Word (FSW) register 840—in the embodiment illustrated, these registers are used by x87 instruction set extensions to set rounding modes, exception masks and flags in the case of the FCW, and to keep track of exceptions in the case of the FSW.

Scalar floating point stack register file (x87 stack) 845 on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Segment registers 855—in the illustrated embodiment, there are six 16 bit registers use to store data used for segmented address generation.

RIP register 865—in the illustrated embodiment, this 64 bit register that stores the instruction pointer.

Alternative embodiments of the invention may use wider or narrower registers. Additionally, alternative embodiments of the invention may use more, less, or different register files and registers.

Exemplary in-Order Processor Architecture—FIGS. 9A-9B

FIGS. 9A-B illustrate a block diagram of an exemplary in-order processor architecture. These exemplary embodiments are designed around multiple instantiations of an in-order CPU core that is augmented with a wide vector processor (VPU). Cores communicate through a high-bandwidth interconnect network with some fixed function logic, memory I/O interfaces, and other necessary I/O logic, depending on the e13t application. For example, an implementation of this embodiment as a stand-alone GPU would typically include a PCIe bus.

FIG. 9A is a block diagram of a single CPU core, along with its connection to the on-die interconnect network 902 and with its local subset of the level 2 (L2) cache 904, according to embodiments of the invention. An instruction decoder 900 supports the x86 instruction set with an extension including the specific vector instruction format 700. While in one embodiment of the invention (to simplify the design) a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The L1 cache 906 allows low-latency accesses to cache memory into the scalar and vector units. Together with load-op instructions in the vector friendly instruction format, this means that the L1 cache 906 can be treated somewhat like an extended register file. This significantly improves the performance of many algorithms, especially with the eviction hint field 652B.

The local subset of the L2 cache 904 is part of a global L2 cache that is divided into separate local subsets, one per CPU core. Each CPU has a direct access path to its own local subset of the L2 cache 904. Data read by a CPU core is stored in its L2 cache subset 904 and can be accessed quickly, in parallel with other CPUs accessing their own local L2 cache subsets. Data written by a CPU core is stored in its own L2 cache subset 904 and is flushed from other subsets, if necessary. The ring network ensures coherency for shared data.

FIG. 9B is an exploded view of part of the CPU core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating the resulting vector writes.

Register data can be swizzled in a variety of ways, e.g. to support matrix multiplication. Data from memory can be replicated across the VPU lanes. This is a common operation in both graphics and non-graphics parallel data processing, which significantly increases the cache efficiency.

The ring network is bi-directional to allow agents such as CPU cores, L2 caches and other logic blocks to communicate with each other within the chip. Each ring data-path is 812-bits wide per direction.

Exemplary Out-of-Order Architecture—FIG. 10

Figure 1:
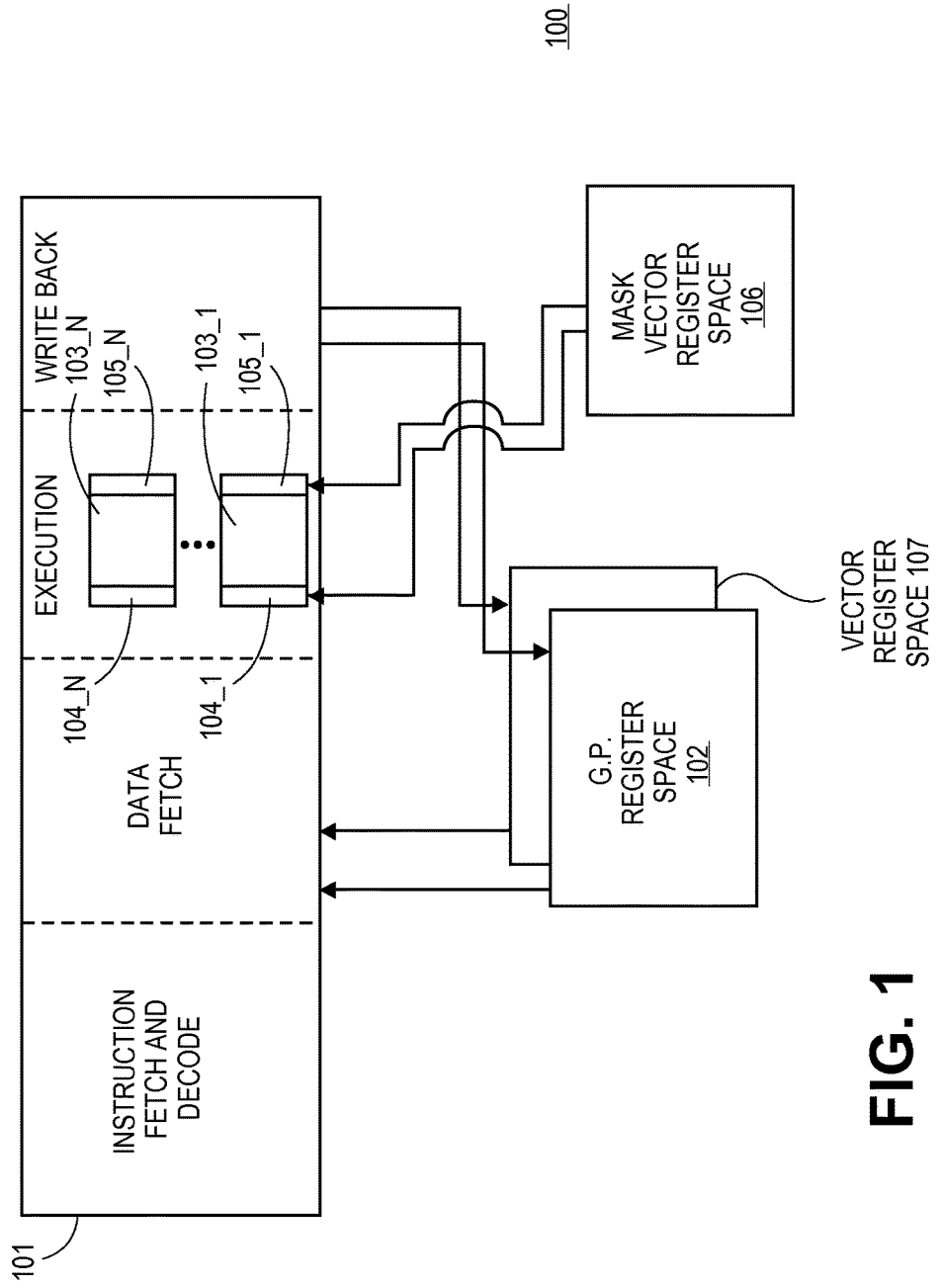

FIG. 10 is a block diagram illustrating an exemplary out-of-order architecture according to embodiments of the invention and can be viewed as a more specific description of a pipeline such as the pipeline discussed above in FIG. 1. Specifically, FIG. 10 illustrates a well-known exemplary out-of-order architecture that has been modified to incorporate the vector friendly instruction format and execution thereof. In FIG. 10 arrows denotes a coupling between two or more units and the direction of the arrow indicates a direction of data flow between those units. FIG. 10 includes a front end unit 1005 coupled to an execution engine unit 1010 and a memory unit 1015; the execution engine unit 1010 is further coupled to the memory unit 1015.

The front end unit 1005 includes a level 1 (L1) branch prediction unit 1020 coupled to a level 2 (L2) branch prediction unit 1022. The L1 and L2 brand prediction units 1020 and 1022 are coupled to an L1 instruction cache unit 1024. The L1 instruction cache unit 1024 is coupled to an instruction translation lookaside buffer (TLB) 1026 which is further coupled to an instruction fetch and predecode unit 1028. The instruction fetch and predecode unit 1028 is coupled to an instruction queue unit 1030 which is further coupled a decode unit 1032. The decode unit 1032 comprises a complex decoder unit 1034 and three simple decoder units 1036, 1038, and 1040. The decode unit 1032 includes a micro-code ROM unit 1042. The decode unit 1032 may operate as previously described above in the decode stage section. The L1 instruction cache unit 1024 is further coupled to an L2 cache unit 1048 in the memory unit 1015. The instruction TLB unit 1026 is further coupled to a second level TLB unit 1046 in the memory unit 1015. The decode unit 1032, the micro-code ROM unit 1042, and a loop stream detector unit 1044 are each coupled to a rename/allocator unit 1056 in the execution engine unit 1010.

The execution engine unit 1010 includes the rename/allocator unit 1056 that is coupled to a retirement unit 1074 and a unified scheduler unit 1058. The retirement unit 1074 is further coupled to execution units 1060 and includes a reorder buffer unit 1078. The unified scheduler unit 1058 is further coupled to a physical register files unit 1076 which is coupled to the execution units 1060. The physical register files unit 1076 comprises a vector registers unit 1077A, a write mask registers unit 1077B, and a scalar registers unit 1077C; these register units may provide the vector registers 810, the vector mask registers 815, and the general purpose registers 825; and the physical register files unit 1076 may include additional register files not shown (e.g., the scalar floating point stack register file 845 aliased on the MMX packed integer flat register file 850). The execution units 1060 include three mixed scalar and vector units 1062, 1064, and 1072; a load unit 1066; a store address unit 1068; a store data unit 1070. The load unit 1066, the store address unit 1068, and the store data unit 1070 are each coupled further to a data TLB unit 1052 in the memory unit 1015.

The memory unit 1015 includes the second level TLB unit 1046 which is coupled to the data TLB unit 1052. The data TLB unit 1052 is coupled to an L1 data cache unit 1054. The L1 data cache unit 1054 is further coupled to an L2 cache unit 1048. In some embodiments, the L2 cache unit 1048 is further coupled to L3 and higher cache units 1050 inside and/or outside of the memory unit 1015.

By way of example, the exemplary out-of-order architecture may implement the process pipeline 8200 as follows: 1) the instruction fetch and predecode unit 1028 perform the fetch and length decoding stages; 2) the decode unit 1032 performs the decode stage; 3) the rename/allocator unit 1056 performs the allocation stage and renaming stage; 4) the unified scheduler 1058 performs the schedule stage; 5) the physical register files unit 1076, the reorder buffer unit 1078, and the memory unit 1015 perform the register read/memory read stage; the execution units 1060 perform the execute/data transform stage; 6) the memory unit 1015 and the reorder buffer unit 1078 perform the write back/memory write stage 1960; 7) the retirement unit 1074 performs the ROB read stage; 8) various units may be involved in the exception handling stage; and 9) the retirement unit 1074 and the physical register files unit 1076 perform the commit stage.

Exemplary Single Core and Multicore Processors—FIG. 15

FIG. 15 is a block diagram of a single core processor and a multicore processor 1500 with integrated memory controller and graphics according to embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and an integrated graphics logic 1508.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508, the set of shared cache units 1506, and the system agent unit 1510, alternative embodiments may use any number of well-known techniques for interconnecting such units.

In some embodiments, one or more of the cores 1502A-N are capable of multi-threading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture and/or instruction set. For example, some of the cores 1502A-N may be in order (e.g., like that shown in FIGS. 9A and 9B) while others are out-of-order (e.g., like that shown in FIG. 10). As another example, two or more of the cores 1502A-N may be capable of executing the same instruction set, while others may be capable of executing only a subset of that instruction set or a different instruction set. At least one of the cores is capable of executing the vector friendly instruction format described herein.

The processor may be a general-purpose processor, such as a Core™ i3, i5, i7, 2 Duo and Quad, Xeon™, or Itanium™ processor, which are available from Intel Corporation, of Santa Clara, Calif. Alternatively, the processor may be from another company. The processor may be a special-purpose processor, such as, for example, a network or communication processor, compression engine, graphics processor, co-processor, embedded processor, or the like. The processor may be implemented on one or more chips. The processor 1500 may be a part of and/or may be implemented on one or more substrates using any of a number of process technologies, such as, for example, BiCMOS, CMOS, or NMOS.

Exemplary Computer Systems and Processors—FIGS. 11-13

FIGS. 11-13 are exemplary systems suitable for including the processor 1500, while FIG. 88 is an exemplary system on a chip (SoC) that may include one or more of the cores 1502. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 11, shown is a block diagram of a system 1100 in accordance with one embodiment of the invention. The system 1100 may include one or more processors 1110, 1115, which are coupled to graphics memory controller hub (GMCH) 1120. The optional nature of additional processors 1115 is denoted in FIG. 11 with broken lines.

Each processor 1110, 1115 may be some version of processor 1500. However, it should be noted that it is unlikely that integrated graphics logic and integrated memory control units would exist in the processors 1110, 1115.

FIG. 11 illustrates that the GMCH 1120 may be coupled to a memory 1140 that may be, for example, a dynamic random access memory (DRAM). The DRAM may, for at least one embodiment, be associated with a non-volatile cache.

The GMCH 1120 may be a chipset, or a portion of a chipset. The GMCH 1120 may communicate with the processor(s) 1110, 1115 and control interaction between the processor(s) 1110, 1115 and memory 1140. The GMCH 1120 may also act as an accelerated bus interface between the processor(s) 1110, 1115 and other elements of the system 1100. For at least one embodiment, the GMCH 1120 communicates with the processor(s) 1110, 1115 via a multi-drop bus, such as a frontside bus (FSB) 1195.

Furthermore, GMCH 1120 is coupled to a display 1145 (such as a flat panel display). GMCH 1120 may include an integrated graphics accelerator. GMCH 1120 is further coupled to an input/output (I/O) controller hub (ICH) 1150, which may be used to couple various peripheral devices to system 1100. Shown for example in the embodiment of FIG. 11 is an external graphics device 1160, which may be a discrete graphics device coupled to ICH 1150, along with another peripheral device 1170.

Alternatively, additional or different processors may also be present in the system 1100. For example, additional processor(s) 1115 may include additional processors(s) that are the same as processor 1110, additional processor(s) that are heterogeneous or asymmetric to processor 1110, accelerators (such as, e.g., graphics accelerators or digital signal processing (DSP) units), field programmable gate arrays, or any other processor. There can be a variety of differences between the physical resources 1110, 1115 in terms of a spectrum of metrics of merit including architectural, micro-architectural, thermal, power consumption characteristics, and the like. These differences may effectively manifest themselves as asymmetry and heterogeneity amongst the processing elements 1110, 1115. For at least one embodiment, the various processing elements 1110, 1115 may reside in the same die package.

Referring now to FIG. 12, shown is a block diagram of a second system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. As shown in FIG. 12, each of processors 1270 and 1280 may be some version of the processor 1500.

Alternatively, one or more of processors 1270, 1280 may be an element other than a processor, such as an accelerator or a field programmable gate array.

While shown with only two processors 1270, 1280, it is to be understood that the scope of the present invention is not so limited. In other embodiments, one or more additional processing elements may be present in a given processor.

Processor 1270 may further include an integrated memory controller hub (IMC) 1272 and point-to-point (P-P) interfaces 1276 and 1278. Similarly, second processor 1280 may include a IMC 1282 and P-P interfaces 1286 and 1288. Processors 1270, 1280 may exchange data via a point-to-point (PtP) interface 1250 using PtP interface circuits 1278, 1288. As shown in FIG. 12, IMC's 1272 and 1282 couple the processors to respective memories, namely a memory 1242 and a memory 1244, which may be portions of main memory locally attached to the respective processors.

Processors 1270, 1280 may each exchange data with a chipset 1290 via individual P-P interfaces 1252, 1254 using point to point interface circuits 1276, 1294, 1286, 1298. Chipset 1290 may also exchange data with a high-performance graphics circuit 1238 via a high-performance graphics interface 1239.

A shared cache (not shown) may be included in either processor outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, second bus 1220 may be a low pin count (LPC) bus. Various devices may be coupled to second bus 1220 including, for example, a keyboard/mouse 1222, communication devices 1226 and a data storage unit 1228 such as a disk drive or other mass storage device which may include code 1230, in one embodiment. Further, an audio I/O 1224 may be coupled to second bus 1220. Note that other architectures are possible. For example, instead of the point-to-point architecture of FIG. 12, a system may implement a multi-drop bus or other such architecture.

Referring now to FIG. 13, shown is a block diagram of a third system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processing elements 1270, 1280 may include integrated memory and I/O control logic ("CL") 1272 and 1282, respectively. For at least one embodiment, the CL 1272, 1282 may include memory controller hub logic (IMC) such as that described above in connection with FIGS. 89 and 12. In addition. CL 1272, 1282 may also include I/O control logic. FIG. 13 illustrates that not only are the memories 1242, 1244 coupled to the CL 1272, 1282, but also that I/O devices 1314 are also coupled to the control logic 1272, 1282. Legacy I/O devices 1315 are coupled to the chipset 1290.

Referring now to FIG. 14, shown is a block diagram of a SoC 1400 in accordance with an embodiment of the present invention. Similar elements in FIG. 15 bear like reference numerals. Also, dashed lined boxes are optional features on more advanced SoCs. In FIG. 14, an interconnect unit(s) 1402 is coupled to: an application processor 1410 which includes a set of one or more cores 1502A-N and shared cache unit(s) 1506; a system agent unit 1510; a bus controller unit(s) 1516; an integrated memory controller unit(s) 1514; a set or one or more media processors 1420 which may include integrated graphics logic 1508, an image processor 1424 for providing still and/or video camera functionality, an audio processor 1426 for providing hardware audio acceleration, and a video processor 1428 for providing video encode/decode acceleration; an static random access memory (SRAM) unit 1430; a direct memory access (DMA) unit 1432; and a display unit 1440 for coupling to one or more external displays.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code may be applied to input data to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks (compact disk read-only memories (CD-ROMs), compact disk rewritables (CD-RWs)), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the invention also include non-transitory, tangible machine-readable media containing instructions the vector friendly instruction format or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616 (it is assume that some of the instructions that were compiled are in the vector friendly instruction format). The processor with at least one x86 instruction set core 1616 represents any processor that can perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 90 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Certain operations of the instruction(s) in the vector friendly instruction format disclosed herein may be performed by hardware components and may be embodied in machine-executable instructions that are used to cause, or at least result in, a circuit or other hardware component programmed with the instructions performing the operations. The circuit may include a general-purpose or special-purpose processor, or logic circuit, to name just a few examples. The operations may also optionally be performed by a combination of hardware and software. Execution logic and/or a processor may include specific or particular circuitry or other logic responsive to a machine instruction or one or more control signals derived from the machine instruction to store an instruction specified result operand. For example, embodiments of the instruction(s) disclosed herein may be executed in one or more the systems of FIGS. 11-16 and embodiments of the instruction(s) in the vector friendly instruction format may be stored in program code to be executed in the systems. Additionally, the processing elements of these figures may utilize one of the detailed pipelines and/or architectures (e.g., the in-order and out-of-order architectures) detailed herein. For example, the decode unit of the in-order architecture may decode the instruction(s), pass the decoded instruction to a vector or scalar unit, etc.

The above description is intended to illustrate preferred embodiments of the present invention. From the discussion above it should also be apparent that especially in such an area of technology, where growth is fast and further advancements are not easily foreseen, the invention can may be modified in arrangement and detail by those skilled in the art without departing from the principles of the present invention within the scope of the accompanying claims and their equivalents. For example, one or more operations of a method may be combined or further broken apart.

Alternative Embodiments

While embodiments have been described which would natively execute the vector friendly instruction format, alternative embodiments of the invention may execute the vector friendly instruction format through an emulation layer running on a processor that executes a different instruction set (e.g., a processor that executes the MIPS instruction set of MIPS Technologies of Sunnyvale, Calif., a processor that executes the ARM instruction set of ARM Holdings of Sunnyvale, Calif.). Also, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below.

What is claimed is:

1. A processor comprising:
   an instruction execution pipeline comprising:
      an instruction fetch stage to fetch a first instruction and a second instruction, an instruction format of the first instruction specifying a first register storing a first input vector that is misaligned with respect to memory addressing space, a second register storing a second, next input vector that is misaligned with respect to the memory addressing space, a first resultant vector, and a third input operand, and an instruction format of the second instruction specifying the second register storing the second, next input vector that is misaligned with respect to the memory addressing space, a third register storing a third, next input vector that is misaligned with respect to the memory addressing space, a second resultant vector, and a fourth input operand;
      an instruction decoder to decode said first instruction into a decoded first instruction, and decode said second instruction into a decoded second instruction; and
      an execution unit to:
         execute the decoded first instruction to cause a routing network to route a first contiguous group of elements from a first end of the first input vector to a second end of said first resultant vector, route a second contiguous group of elements from a second end of the second, next input vector to a first end of said first resultant vector, said first end of the first input vector and said second end of the second, next input vector being opposite vector ends, and preserve the second, next input vector in the second register after execution of the decoded first instruction, wherein said first and second contiguous groups of elements of the first input vector and the second, next input vector are defined from said third input operand, and
         execute the decoded second instruction to cause the routing network to route a first contiguous group of elements from a first end of the second, next input vector to a second end of said second resultant vector, route a second contiguous group of elements from a second end of the third, next input vector to a first end of said second resultant vector, said first end of the second, next input vector and said second end of the third, next input vector being opposite vector ends, wherein said first and second contiguous groups of elements of the second, next input vector and the third, next input vector are defined from said fourth input operand.

2. The processor of claim 1, wherein said third input operand is specified as a scalar.

3. The processor of claim 1, wherein said third input operand is embodied with a mask vector.

4. The processor of claim 1, wherein said first end of the first input vector is a left end and said second end of the second, next input vector is a right end.

5. The processor of claim 1, wherein said first end of the first input vector is a right end and said second end of the second, next input vector is a left end.

6. The processor of claim 1, wherein the execution unit is to execute the decoded second instruction to further preserve the third, next input vector in the third register after execution of the decoded second instruction.

7. The processor of claim 1, wherein the first resultant vector is stored as a resultant of the first instruction in a register that is not the first register and not the second register.

8. A non-transitory machine readable medium containing program code stored therein that when processed by a computing system causes a method to be performed, said method comprising:
  detecting processing of an array having misaligned data rows;
  compiling said processing of said array into a software pipelined loop a program code sequence having a first instruction and a second instruction, an instruction format of the first instruction specifying a first register storing a first input vector of the array that is misaligned with respect to memory addressing space, a second register storing a second, next input vector of the array that is misaligned with respect to the memory addressing space, a first resultant vector, and a third input operand, and an instruction format of the second instruction specifying the second register storing the second, next input vector of the array that is misaligned with respect to the memory addressing space, a third register storing a third, next input vector of the array that is misaligned with respect to the memory addressing space, a second resultant vector, and a fourth input operand;
  decoding said first instruction into a decoded first instruction;
  decoding said second instruction into a decoded second instruction;
  executing the decoded first instruction to cause a routing network to route a first contiguous group of elements from a first end of the first input vector to a second end of said first resultant vector, route a second contiguous group of elements from a second end of the second, next input vector to a first end of said first resultant vector, said first end of the first input vector and said second end of the second, next input vector being opposite vector ends, and preserve the second, next input vector in the second register after execution of the decoded first instruction, wherein said first and second contiguous groups of elements of the first input vector and the second, next input vector are defined from said third input operand; and
  executing the decoded second instruction to cause the routing network to route a first contiguous group of elements from a first end of the second, next input vector to a second end of said second resultant vector, route a second contiguous group of elements from a second end of the third, next input vector to a first end of said second resultant vector, said first end of the second, next input vector and said second end of the third, next input vector being opposite vector ends, wherein said first and second contiguous groups of elements of the second, next input vector and the third, next input vector are defined from said fourth input operand.

9. The non-transitory machine readable medium of claim 8, wherein peeling is not used in formulating said program code sequence.

10. The non-transitory machine readable medium of claim 8, wherein said first resultant vector is an aligned row of said array.

11. The non-transitory machine readable medium of claim 10, wherein said program code sequence includes code to process said aligned row.

12. The non-transitory machine readable medium of claim 10, wherein said first resultant vector includes sections of two different rows of said array.

13. The non-transitory machine readable medium of claim 10, wherein the executing of the decoded second instruction further comprises preserving the third, next input vector in the third register after execution of the decoded second instruction.

14. The non-transitory machine readable medium of claim 13, wherein memory accesses for the rows are not aligned with row boundaries.

15. The non-transitory machine readable medium of claim 10, wherein the first resultant vector is stored as a resultant of the first instruction in a register that is not the first register and not the second register.

16. The non-transitory machine readable medium of claim 15, wherein memory accesses for the rows are not aligned with row boundaries.

17. A computing system comprising:
  a system memory;
  a processor coupled to said system memory, said processor comprising an instruction execution pipeline comprising:
    an instruction fetch stage to fetch a first instruction and a second instruction, an instruction format of the first instruction specifying a first register storing a first input vector that is misaligned with respect to memory addressing space, a second register storing a second, next input vector that is misaligned with respect to the memory addressing space, a first resultant vector, and a third input operand, and an instruction format of the second instruction specifying the second register storing the second, next input vector that is misaligned with respect to the memory addressing space, a third register storing a third, next input vector that is misaligned with respect to the memory addressing space, a second resultant vector, and a fourth input operand;
    an instruction decoder to decode said first instruction into a decoded first instruction, and decode said second instruction into a decoded second instruction; and
    an execution unit to:
      execute the decoded first instruction to cause a routing network to route a first contiguous group of elements from a first end of the first input vector to a second end of said first resultant vector, route a second contiguous group of elements from a second end of the second, next input vector to a first end of said first resultant vector, said first end of the first input vector and said second end of the second, next input vector being opposite vector ends, and preserve the second, next input vector in the second register after execution of the decoded first instruction, wherein said first and second contiguous groups of elements of the first input vector and the second, next input vector are defined from said third input operand, and execute the decoded second instruction to cause the routing network to route a first contiguous group of elements from a first end of the second, next input vector to a second end of said second resultant vector, route a second contiguous group of elements from a second end of the third, next input vector to a first end of said second resultant vector, said first end of the second, next input vector and said second end of the third, next input vector being opposite vector ends, wherein said first and second contiguous groups of elements of the second, next input vector and the third, next input vector are defined from said fourth input operand.

18. The computing system of claim 17, wherein said third input operand is specified as a scalar.

19. The computing system of claim 17, wherein said third input operand is embodied with a mask vector.

20. The computing system of claim 17, wherein said first end of the first input vector is a left end and said second end of the second, next input vector is a right end.

21. The computing system of claim 17, wherein said first end of the first input vector is a right end and said second end of the second, next input vector is a left end.

22. The computing system of claim 17, wherein said system memory contains compiled code to process an array having misaligned data rows wherein aligned accesses are made to said system memory to process said array's data.

* * * * *